(12) United States Patent
So et al.

(10) Patent No.: US 12,343,877 B2
(45) Date of Patent: Jul. 1, 2025

(54) DRIVING ROBOT APPARATUS, CONTROL METHOD OF THE DRIVING ROBOT APPARATUS, AND RECORDING MEDIUM HAVING RECORDED THEREON COMPUTER PROGRAM

(71) Applicant: SAMSUNG ELECTRONICS CO., LTD., Suwon-si (KR)

(72) Inventors: Jeayun So, Suwon-si (KR); Minwoo Ryu, Suwon-si (KR); Jinhee Kim, Suwon-si (KR); Jihye Seo, Suwon-si (KR); Sangsik Yoon, Suwon-si (KR); Yeonkyu Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 164 days.

(21) Appl. No.: 18/126,571

(22) Filed: Mar. 27, 2023

(65) Prior Publication Data

US 2023/0356398 A1  Nov. 9, 2023

Related U.S. Application Data

(63) Continuation of application No. PCT/KR2023/003649, filed on Mar. 20, 2023.

(30) Foreign Application Priority Data

May 4, 2022 (KR) .................... 10-2022-0055722

(51) Int. Cl.
*B25J 9/16* (2006.01)
*B25J 11/00* (2006.01)

(52) U.S. Cl.
CPC .......... *B25J 9/1666* (2013.01); *B25J 9/1697* (2013.01); *B25J 11/0085* (2013.01)

(58) Field of Classification Search
CPC .... B25J 9/1666; B25J 9/1697; B25J 11/0085; B25J 9/0003; B25J 9/1664; B25J 19/021;
(Continued)

(56) References Cited

U.S. PATENT DOCUMENTS 5,424,939 A  6/1995 Kweon
7,610,651 B2 11/2009 Baek
(Continued)

FOREIGN PATENT DOCUMENTS

CN 110960157 A 4/2020
EP 3 485 788 A1 5/2019
(Continued)

OTHER PUBLICATIONS

International Search Report, PCT/ISA/210, dated Jun. 14, 2023 issued in PCT Application No. PCT/KR2023/003649.
(Continued)

*Primary Examiner* — Khoi H Tran
*Assistant Examiner* — Nhi Q Bui
(74) *Attorney, Agent, or Firm* — STAAS & HALSEY LLP

(57) ABSTRACT

Provided are a driving robot apparatus including a rotatable holder to which a cleaning pad is fixable, a method of controlling the driving robot apparatus, and a computer-readable recording medium having recorded thereon a computer program. The method of controlling the driving robot apparatus includes rotating the holder with a cleaning pad fixed to the holder; emitting light through an opening in the holder to a surface of the cleaning pad fixed to the holder while the holder is rotating, the surface of the cleaning pad including two or more reflective areas having different light reflectivities from each other; receiving reflected light reflected from the surface of the cleaning pad through the opening in the holder while the holder is rotating; and
(Continued)

identifying the cleaning pad based on the received reflected light.

20 Claims, 13 Drawing Sheets

(58) Field of Classification Search
CPC ............. A47L 2201/06; A47L 11/4011; A47L 11/4038; A47L 11/4088; A47L 2201/04; G05B 15/02; G05B 2219/45098
See application file for complete search history.

(56) References Cited

U.S. PATENT DOCUMENTS

| | | | |
|---|---|---|---|
| 9,078,552 B2 | 7/2015 | Han et al. | |
| 9,173,539 B2 | 11/2015 | Yoon et al. | |
| 9,314,141 B2 | 4/2016 | Lee et al. | |
| 9,320,409 B1 | 4/2016 | Lu et al. | |
| 9,414,734 B2 | 8/2016 | Moon et al. | |
| 9,565,984 B2 | 2/2017 | Lu et al. | |
| 9,907,449 B2 | 3/2018 | Lu et al. | |
| 9,931,008 B2 | 4/2018 | Yoo et al. | |
| 10,064,533 B2 | 9/2018 | Lu et al. | |
| 10,499,783 B2 | 12/2019 | Lu et al. | |
| 10,791,902 B2 | 10/2020 | Reimels et al. | |
| 10,952,585 B2 | 3/2021 | Lu et al. | |
| 10,993,598 B2 | 5/2021 | Park et al. | |
| 11,058,276 B2 | 7/2021 | Fox et al. | |
| 11,478,120 B2 | 10/2022 | Jang et al. | |
| 11,589,723 B2 | 2/2023 | Shin et al. | |
| 11,625,039 B2 * | 4/2023 | Yun ................... A47L 11/4038 15/98 | |
| 2019/0038101 A1 | 2/2019 | Jang et al. | |
| 2019/0374083 A1 | 12/2019 | Dooley et al. | |
| 2020/0214528 A1 | 7/2020 | Williams et al. | |
| 2020/0253445 A1 | 8/2020 | So et al. | |
| 2021/0030241 A1 * | 2/2021 | Kim ................... A47L 11/4088 | |
| 2021/0030247 A1 | 2/2021 | Jang et al. | |
| 2021/0093144 A1 | 4/2021 | Shin et al. | |
| 2021/0093145 A1 | 4/2021 | Kim et al. | |
| 2021/0267429 A1 * | 9/2021 | Lu ..................... A47L 11/4083 | |
| 2022/0071465 A1 | 3/2022 | Kim et al. | |
| 2022/0257080 A1 | 8/2022 | Lu et al. | |
| 2022/0287534 A1 | 9/2022 | Jang et al. | |

FOREIGN PATENT DOCUMENTS

| | | | |
|---|---|---|---|
| EP | 3666151 A1 | 6/2020 | |
| JP | 2016170076 A * | 9/2016 | |
| KR | 1996-0013312 | 5/1996 | |
| KR | 1996-0014584 | 10/1996 | |
| KR | 10-0514993 | 9/2005 | |
| KR | 20-0435130 | 1/2007 | |
| KR | 10-0704483 | 4/2007 | |
| KR | 10-0982383 | 9/2010 | |
| KR | 10-1231932 | 3/2013 | |
| KR | 10-2014-0027682 | 3/2014 | |
| KR | 10-2015-0048490 | 5/2015 | |
| KR | 10-2017-0128249 | 11/2017 | |
| KR | 10-1907161 | 10/2018 | |
| KR | 10-2019-0003776 | 1/2019 | |
| KR | 10-2019-0015932 | 2/2019 | |
| KR | 10-1960816 | 3/2019 | |
| KR | 10-1938703 | 4/2019 | |
| KR | 10-2015311 | 8/2019 | |
| KR | 10-2015323 | 8/2019 | |
| KR | 10-2020-0103900 | 9/2020 | |
| KR | 10-2021-0015122 | 2/2021 | |
| KR | 10-2021-0025456 | 3/2021 | |
| KR | 10-2021-0036736 | 4/2021 | |
| KR | 10-2021-0037064 | 4/2021 | |
| KR | 10-2251550 | 5/2021 | |
| KR | 10-2363173 | 2/2022 | |
| KR | 10-2022-0036577 | 3/2022 | |
| KR | 10-2385214 | 4/2022 | |
| WO | WO 2018/012917 A1 | 1/2018 | |

OTHER PUBLICATIONS

Written Opinion, PCT/ISA/237, dated Jun. 14, 2023 issued in PCT Application No. PCT/KR2023/003649.

PCT/ISA/220 dated Jun. 14, 2023 issued in PCT Application No. PCT/KR2023/003649.

* cited by examiner

DRIVING ROBOT APPARATUS, CONTROL METHOD OF THE DRIVING ROBOT APPARATUS, AND RECORDING MEDIUM HAVING RECORDED THEREON COMPUTER PROGRAM

CROSS-REFERENCE TO RELATED APPLICATIONS

This application is a continuation application of International Application No. PCT/KR2023/003649, filed on Mar. 20, 2023, and claims priority to Korean Patent Application No. 10-2022-0055722, filed on May 4, 2022, the disclosures of which are incorporated by reference herein in their entireties.

BACKGROUND

1. Field

The disclosure relates to a driving robot apparatus, a control method of the driving robot apparatus, and a computer-readable recording medium having recorded thereon a computer program.

2. Description of Related Art

The Internet of things (IoT) is a foundation technology and service of the hyper-connected society and the next-generation Internet. The IoT may also be defined as the Internet of objects and refers to an environment in which information generated by uniquely identifiable objects is shared via the Internet.

Internet-connected devices (IoT devices) use built-in sensors to collect data and to respond thereto according to circumstances. IoT devices are useful for improving how people work and live. IoT devices are applied in various fields, from smart home devices that automatically adjust heating and lighting to smart factories that monitor industrial equipment to find problems and automatically solve any problems found.

On the other hand, IoT devices may also be used in a driving robot apparatus for cleaning. The driving robot apparatus for cleaning is a home appliance that performs vacuum cleaning or wet mop cleaning in a home. For example, in a case where the driving robot apparatus for cleaning connects to the Internet, even when a user does not live indoors, the user may remotely control the driving robot apparatus for cleaning from the outside by using a mobile terminal, and may reserve a cleaning time by using the mobile terminal. The driving robot apparatus for cleaning performs cleaning in a home by recognizing main home appliances and furniture through object recognition.

SUMMARY

According to an embodiment of the disclosure, a driving robot apparatus may include a holder including an opening and configured to rotate, and to which a cleaning pad is fixable so as to clean the surface as the driving robot apparatus moves over the surface; and a processor configured to perform control to rotate the holder with a cleaning pad fixed to the holder, cause light to be emitted through the opening in the holder to a surface of the cleaning pad fixed to the holder while the holder is rotating, the surface of the cleaning pad including two or more reflective areas having different light reflectivities from each other, receive reflected light reflected from the surface of the cleaning pad through the opening in the holder while the holder is rotating, and identify the cleaning pad based on the received reflected light.

Also, the processor may be further configured to perform control to identify whether the cleaning pad is fixed to the holder by using standard deviation of intensity of the received reflected light.

Also, the processor may be further configured to perform control to determine a traveling path of the driving robot apparatus, based on whether the cleaning pad is fixed to the holder.

Also, the processor may be further configured to perform control to adjust an interval of the traveling path of the driving robot apparatus, based on a result of identifying a holder to which a cleaning pad is not fixed, among a plurality of holders to which cleaning pads are fixed.

Also, the processor may be further configured to perform control to supply an amount of water to the cleaning pad, based on whether the cleaning pad is fixed to the holder.

Also, the processor may be further configured to perform control to, based on identifying an empty holder to which a cleaning pad is not fixed from among a plurality of holders, supply an amount of water to cleaning pads fixed to holders other than the empty holder from among the plurality of holders.

Also, the processor may be further configured to perform control to identify type of the cleaning pad fixed to the holder among a plurality of types of cleaning pads by using standard deviation of intensity of the received reflected light.

Also, the processor may be further configured to perform control to determine a traveling path of the driving robot apparatus, based on the identified type of the cleaning pad.

Also, the processor may be further configured to perform control to supply an amount of water corresponding to the identified type of the cleaning pad to the cleaning pad, based on the identified type of the cleaning pad.

According to an embodiment of the disclosure, a method of controlling a driving robot apparatus, may include rotating a holder with a cleaning pad fixed to the holder; emitting light through an opening in the holder to a surface of the cleaning pad fixed to the holder while the holder is rotating, the surface of the cleaning pad including two or more reflective areas having different light reflectivities from each other; receiving reflected light reflected from the surface of the cleaning pad through the opening in the holder while the holder is rotating; and identifying the cleaning pad based on the received reflected light.

Also, the identifying of the cleaning pad may include identifying whether the cleaning pad is fixed to the holder by using standard deviation of intensity of the received reflected light.

Also, the method may further include determining a traveling path of the driving robot apparatus, based on whether the cleaning pad is fixed to the holder.

Also, the determining of the traveling path may include identifying a holder to which a cleaning pad is not fixed, among a plurality of holders to which cleaning pads are fixed; and adjusting an interval of the traveling path of the driving robot apparatus, based on a result of the identifying the holder to which the cleaning pad is not fixed.

Also, the method may further include supplying an amount of water to the cleaning pad, based on whether the cleaning pad is fixed to the holder.

Also, the method may further include, based on identifying an empty holder to which a cleaning pad is not fixed from among a plurality of holders, supplying an amount of water to cleaning pads fixed to holders other than the empty holder from among the plurality of holders.

Also, the identifying of the cleaning pad may include identifying a type of the cleaning pad fixed to the holder among a plurality of types of cleaning pads by using standard deviation of intensity of the received reflected light.

Also, the method may further include determining a traveling path of the driving robot apparatus, based on the identified type of the cleaning pad.

Also, the method may further include supplying an amount of water corresponding to the identified type of the cleaning pad to the cleaning pad, based on the identified type of the cleaning pad.

According to an embodiment of the disclosure, provided is a computer-readable recording medium having recorded thereon a computer program for causing a computer to perform at least one of the embodiments of the disclosed methods.

According to an embodiment of the disclosure, an application stored in a computer-readable recording medium may execute a function of at least one of the embodiments of the disclosed control methods.

DETAILED DESCRIPTION

Figure 1:
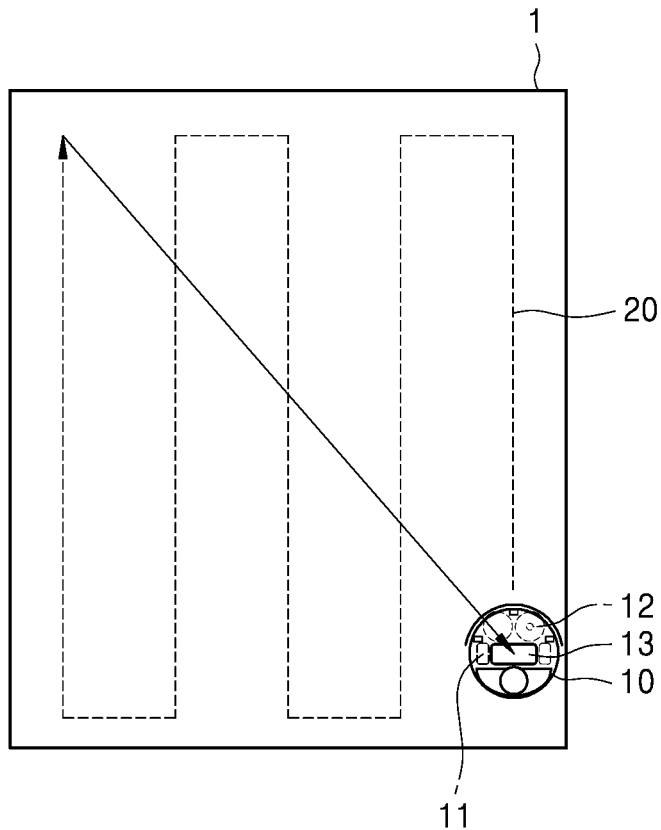
FIG. 1 is a diagram for describing operations of a driving robot apparatus, according to an embodiment of the disclosure.

In the disclosure, the expression "at least one of a, b or c" indicates "a," "b," "c," "a and b," "a and c," "b and c," "all of a, b, and c," or variations thereof.

The disclosure clarifies the scope of the claims and explains the principles of embodiments of the disclosure so that those of ordinary skill in the art may carry out the embodiments of the disclosure set forth in the claims. Embodiments of the disclosure may be implemented in various forms. The embodiments of the disclosure described herein may be implemented alone, or may be implemented as a combination of at least two or more embodiments of the disclosure.

Throughout the disclosure, the same reference numerals refer to the same elements. The disclosure does not explain all elements of the embodiments of the disclosure, and general descriptions in the technical field to which the embodiments of the disclosure belong or redundant descriptions between the embodiments of the disclosure will be omitted. Terms such as "module" or "unit" as used herein may be implemented as software, hardware, or firmware alone or in combination of two or more thereof. According to embodiments of the disclosure, a plurality of "modules" or "units" may be implemented as one element, or one "module" or "unit" may include a plurality of elements.

Some embodiments of the disclosure may be represented by functional block configurations and various processes. All or part of these functional blocks may be implemented in various numbers of hardware and/or software configurations that perform specific functions. For example, the functional blocks of the disclosure may be implemented by one or more microprocessors, or may be implemented by circuit configurations for certain functions. In addition, for example, the functional blocks of the disclosure may be implemented in various programming or scripting languages. The functional blocks may be implemented by algorithms that are executed on one or more processors. In addition, the disclosure may employ a related art for electronic environment setting, signal processing, and/or data processing. Terms such as "mechanism," "element," "means," and "configuration" may be used in a broad sense and are not limited to mechanical and physical configurations.

In describing the embodiment of the disclosure, when the detailed description of the relevant known technology is determined to unnecessarily obscure the gist of the disclosure, the detailed description thereof may be omitted herein. Also, numbers (e.g., first, second, etc.) used in the description of the specification are merely identification symbols for distinguishing one element from another.

Also, when one element is referred to as "connected" or "coupled" to another element, the one element may be directly connected or coupled to the other element, but it will be understood that the elements may be connected or coupled to each other via another element therebetween unless the context clearly indicates otherwise.

Embodiments of the disclosure relate to a driving robot apparatus, a control method of the driving robot apparatus, and a computer-readable recording medium having recorded thereon a computer program.

On the other hand, the technical objectives to be achieved by the embodiments of the disclosure are not limited to the technical objectives described above.

Hereinafter, the operating principle of embodiments of the disclosure and various embodiments of the disclosure will be described with reference to the accompanying drawings.

FIG. 1 is a diagram for describing operations of a driving robot apparatus, according to an embodiment of the disclosure.

Embodiments of the disclosure relate to a driving robot apparatus 10 that travels in a certain area. The driving robot apparatus 10 is a robot apparatus that is movable by itself by using wheels and the like, and is capable of performing cleaning while moving in a certain area. The certain area may be a space to be cleaned, such as a house or an office.

Referring to FIG. 1, the driving robot apparatus 10 may perform vacuum cleaning or wet mop cleaning while traveling within a traveling area 1. The traveling area 1 may be defined according to a certain criterion while the driving robot apparatus starts operating, or may be set in advance by a designer or a user. The traveling area 1 of the driving robot apparatus 10 may be variously defined as a house, a store, an office, or a specific outdoor space. The traveling area 1 of the driving robot apparatus 10 may be defined in advance by a wall, a ceiling, a sign, and the like.

The driving robot apparatus 10 travels along a traveling path 20 within the traveling area 1 by using a moving assembly 11. For example, the driving robot apparatus 10 may move in a certain direction by using one or more wheels in the moving assembly 11. The driving robot apparatus 10 may travel in a zigzag manner within the traveling area 1.

The driving robot apparatus 10 may clean the traveling area 1 by using a cleaning assembly 12 while traveling. The driving robot apparatus 10 may include two or more cleaning assemblies 12. For example, the driving robot apparatus 10 may include the cleaning assembly 12 that performs water cleaning on the traveling area 1. The driving robot apparatus 10 may perform water cleaning by swiping the traveling area 1 with the cleaning pad to which water is supplied from a water tank 13. The driving robot apparatus 10 may perform cleaning by using a rotary motor to rotate a holder that fixes the cleaning pad. As another example, the driving robot apparatus 10 may include a cleaning assembly 12 that sucks up foreign material by vacuum in a certain area. As another example, the driving robot apparatus 10 may include the cleaning assembly 12 that applies vertical and/or horizontal vibration to shake off dust from an object (e.g., a carpet, etc.) located under the driving robot apparatus 10. The cleaning assemblies may be located in other portions of the driving robot apparatus 10. For example, the cleaning assembly 12 that performs water cleaning may be located at the front end of the driving robot apparatus 10, and the cleaning assembly 12 that applies vibration may be located at the rear end of the driving robot apparatus 10.

The driving robot apparatus 10 may travel while identifying an obstacle. The driving robot apparatus 10 may identify the obstacle by using a camera, a sensor, or the like. For example, the driving robot apparatus 10 may detect the obstacle by using an input image captured by a camera. The driving robot apparatus 10 may detect the obstacle by analyzing an input image by using an artificial intelligence model that is built in the driving robot apparatus 10 or is built in a cloud server. As another example, the driving robot apparatus 10 may detect the obstacle by using a distance measuring sensor, such as a lidar.

The driving robot apparatus 10 may determine whether to follow the identified obstacle. The driving robot apparatus 10 may follow the identified obstacle. For example, the driving robot apparatus 10 can move along a wall. As another example, the driving robot apparatus 10 may move along legs of furniture. The driving robot apparatus 10 may adjust the traveling direction of the driving robot apparatus 10, so that the driving robot apparatus 10 is aligned with the obstacle in order to follow the obstacle. Also, the driving robot apparatus 10 may adjust a traveling path so as to avoid the identified obstacle.

When the driving robot apparatus 10 follows the obstacle, one or more cleaning pads may be popped out. For example, the driving robot apparatus 10 may pop out the cleaning pad located toward the obstacle so that the cleaning pad protrudes outward from the driving robot apparatus 10. The driving robot apparatus 10 may pop out the cleaning pad by using a slider that moves the holder to which the cleaning pad is fixed. The driving robot apparatus 10 may pop out the cleaning pad by using an arm having one side connected to the driving robot apparatus 10 and the other side connected to the holder that fixes the cleaning pad. The driving robot apparatus 10 travels so that the popped-out cleaning pad moves along the outer edge of the obstacle, so as to clean an area between the obstacle the bottom of the driving robot apparatus 10.

The driving robot apparatus 10 may pop in the popped-out cleaning pad. For example, the driving robot apparatus 10 may stop following the obstacle and pop in the cleaning pad.

The driving robot apparatus 10 may identify the cleaning pad attached to the driving robot apparatus 10. The driving robot apparatus 10 may emit light to one surface of the cleaning pad and may identify the cleaning pad attached to the driving robot apparatus 10, based on reflected light reflected from the cleaning pad. In this case, the driving robot apparatus 10 may emit light to the cleaning pad through an opening in the holder that fixes the cleaning pad.

The cleaning pad may include two or more reflective areas with different light reflectivities from each other. For example, the driving robot apparatus 10 may identify whether the cleaning pad is attached to the driving robot apparatus 10 by using the standard deviation of intensity of reflected light received from the cleaning pad. As another example, the driving robot apparatus 10 may identify a type of cleaning pad attached to the driving robot apparatus 10 among a plurality of types of cleaning pads by using the standard deviation of intensity of reflected light received from the cleaning pad.

The driving robot apparatus 10 may determine the traveling path 20 of the driving robot apparatus 10, based on a result of identifying whether the cleaning pad is attached to the driving robot apparatus 10. For example, the driving robot apparatus 10 may identify a holder from which the cleaning pad is detached among a plurality of holders to which the cleaning pads are attached. The driving robot apparatus 10 may adjust the interval of the traveling path 20 of the driving robot apparatus 10, based on a result of identifying the holder from which the cleaning pad is detached.

The driving robot apparatus 10 may determine the traveling path 20 of the driving robot apparatus 10, based on the type of the cleaning pad identified by using the standard deviation of intensity of reflected light received from the cleaning pad. For example, the driving robot apparatus 10 may determine the traveling path 20 so as to travel in the traveling area 1 only once, based on a result of identifying a cleaning pad including a multi-use cotton cloth. As another example, the driving robot apparatus 10 may determine the traveling path 20 so as to travel in a part of the traveling area 1 twice or more times, based on a result of identifying a cleaning pad including a disposable non-woven fabric.

The driving robot apparatus 10 may control the amount of water to be supplied to the cleaning pad, based on whether the cleaning pad is attached to the holder. For example, the driving robot apparatus 10 may control the amount of water to be supplied to the holder from which the cleaning pad is detached, based on a result of identifying the holder from which the cleaning pad is detached among the holders to which the cleaning pads are attached. As another example, the driving robot apparatus 10 may control the amount of water to be supplied to the cleaning pad, based on the type of the cleaning pad.

According to embodiments of the disclosure, the cleaning pad attached to the driving robot apparatus 10 may be easily identified, and the traveling path 20 may be flexibly adjusted when the cleaning pad is detached from the driving robot apparatus 10. Also, the driving robot apparatus 10 may identify the type of the cleaning pad attached to the driving robot apparatus 10, may adjust the traveling path 20 according to the identified type of the cleaning pad, and may control water supply.

Figure 2:
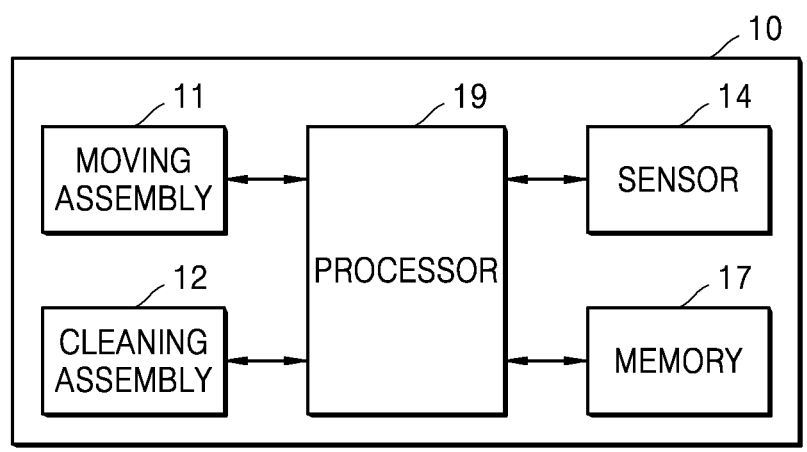
FIG. 2 is a block diagram illustrating a structure of a driving robot apparatus, according to an embodiment of the disclosure.

FIG. 2 is a block diagram illustrating a structure of a driving robot apparatus, according to an embodiment of the disclosure.

Referring to FIG. 2, a driving robot apparatus 10 according to an embodiment of the disclosure may include a moving assembly 11, a cleaning assembly 12, a sensor 14, a memory 17, and a processor 19. However, not all elements illustrated in FIG. 2 are essential elements of the driving robot apparatus 10. It will be understood by those of ordinary skill in the art related to the present embodiment of the disclosure that the driving robot apparatus 10 may be implemented with more elements than the elements illustrated in FIG. 2, or may be implemented with fewer elements than the elements illustrated in FIG. 2.

The moving assembly 11 may be located under the driving robot apparatus 10 and may move the driving robot apparatus 10 forward and backward and rotate the driving robot apparatus 10.

The cleaning assembly 12 performs cleaning while the driving robot apparatus is traveling. The cleaning assembly 12 may be located under the driving robot apparatus 10.

According to an embodiment of the disclosure, the cleaning assembly 12 may be classified according to the purpose and structure. For example, the cleaning assembly 12 may include a cleaning assembly that performs wet mop cleaning, a cleaning assembly that sucks up foreign material by vacuum, and a cleaning assembly that applies vertical and/or horizontal vibration to shake off dust from an object. The driving robot apparatus 10 may include one or more cleaning assemblies 12 according to the purpose.

The sensor 14 obtains data to be used when the driving robot apparatus 10 travels and/or performs cleaning. For example, the sensor 14 may obtain an image to be used to detect an obstacle located near the driving robot apparatus 10. As another example, the sensor 14 may detect a distance to the obstacle located near the driving robot apparatus 10. As another example, the sensor 14 may obtain information about the position of the driving robot apparatus 10 within a certain area. As another example, the sensor 14 may obtain information about approach of a holder fixing a cleaning pad to a certain position. As another example, the sensor 14 may obtain information about whether the cleaning pad is fixed to the holder.

The memory 17 may store programs and instructions for data processing by the processor 19 and control by the driving robot apparatus 10.

According to an embodiment of the disclosure, the memory 17 may include at least one type of storage medium selected from a memory that temporarily stores data, such as random access memory (RAM) or static random access memory (SRAM), and a data storage that non-temporarily stores data, such as flash memory type or read-only memory (ROM).

The processor 19 controls overall operations of the driving robot apparatus 10. The processor 19 may be implemented as one or more processors. The processor 19 may execute instructions stored in the memory 17 to control overall operations of the moving assembly 11, the cleaning assembly 12, the sensor 14, the memory 17, and the like. The processor 19 may execute programs and/or instructions to control the driving robot apparatus 10 to perform embodiments of the disclosure to be described with reference to FIGS. 3 to 14. For example, the processor 19 controls the moving assembly 11 to control the traveling of the driving robot apparatus 10. As another example, the processor 19 controls the cleaning assembly 12 to perform cleaning while the driving robot apparatus 10 is traveling. As another example, the processor 19 may process data obtained by the sensor 14.

Figure 3:
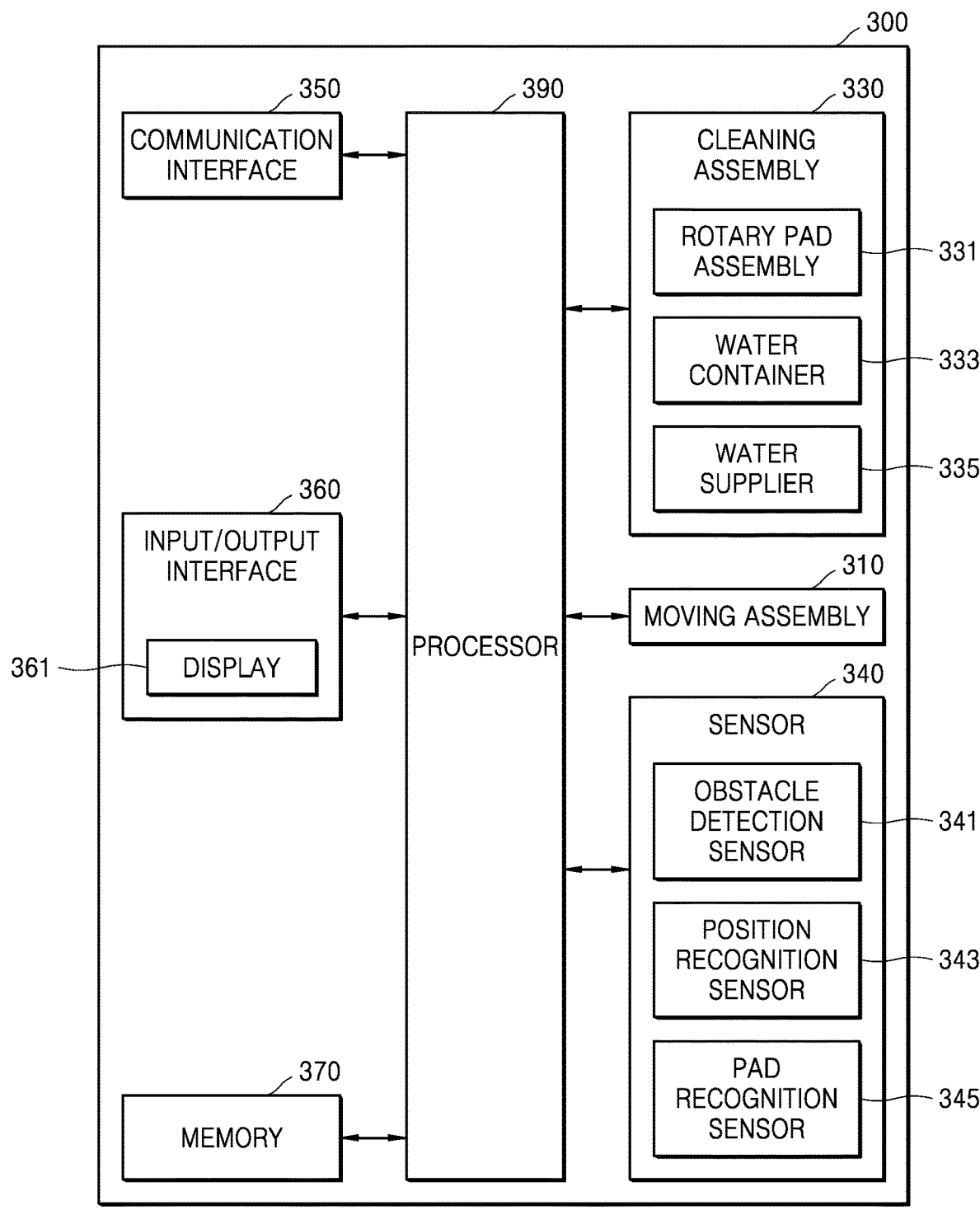
FIG. 3 is a block diagram illustrating a structure of a driving robot apparatus, according to an embodiment of the disclosure.

FIG. 3 is a block diagram illustrating a structure of a driving robot apparatus, according to an embodiment of the disclosure. Referring to FIG. 3, a driving robot apparatus 300 may include a moving assembly 310, a cleaning assembly 330, a sensor 340, a communication interface 350, an input/output interface 360, a memory 370, and a processor 390. However, not all elements illustrated in FIG. 3 are essential elements of the driving robot apparatus 300. It will be understood by those of ordinary skill in the art related to the present embodiment of the disclosure that the driving robot apparatus 300 may be implemented with more elements than the elements illustrated in FIG. 3, or may be implemented with fewer elements than the elements illustrated in FIG. 3.

The moving assembly 310 moves the driving robot apparatus 300.

According to an embodiment of the disclosure, the moving assembly 310 may include a pair of wheels respectively disposed on left and right edges of the center area of the main body of the driving robot apparatus 300. Also, the moving assembly 310 may include a wheel motor that applies a moving force to each wheel, and a caster wheel that is installed in front of the main body and rotates according to the state of the floor on which the driving robot apparatus 10 moves, so that an angle thereof is changed. The pair of wheels may be symmetrically disposed on the main body of the driving robot apparatus 10. The moving assembly 310 may use the wheels to move the driving robot apparatus 300 forward and backward and rotate the driving robot apparatus 300.

The cleaning assembly 330 may perform a cleaning operation while the driving robot apparatus 300 is traveling. For example, the cleaning assembly 330 may perform vibration cleaning, vacuum cleaning, and/or water cleaning.

According to an embodiment of the disclosure, the cleaning assembly 330 may include a rotary pad assembly 331 that cleans a certain area with a wet mop, a water container 333 that contains water to be supplied to the rotary pad assembly 331, and a water supplier 335 that supplies water to the rotary pad assembly 331. The rotary pad assembly 331 may include a cleaning pad, a holder that fixes the cleaning pad, and a rotary motor that rotates the holder.

According to an embodiment of the disclosure, the cleaning assembly 330 may include a mechanism that moves the cleaning pad so that the cleaning pad protrudes outward from the driving robot apparatus 300 and the cleaning pad protruding outward is inserted into the driving robot apparatus 300. For example, the cleaning assembly 330 may include a slider that moves the holder to which the cleaning pad is fixed. As another example, the cleaning assembly 330 may include an arm having one side connected to the driving robot apparatus 300 and the other side connected to the holder that fixes the cleaning pad. The cleaning assembly 330 may include a sensor and a guide that help the cleaning pad protruding outward from the driving robot apparatus 300 be inserted into a proper position.

The sensor 340 obtains sensing data to be used when the driving robot apparatus 300 travels and/or performs cleaning. The sensing data refers to data obtained through various sensors disposed in the driving robot apparatus 300. For example, the sensor 340 may obtain data to be used to detect an obstacle while the driving robot apparatus 300 is traveling. As another example, the sensor 340 may detect a collision avoidance signal (e.g., HALO signal) generated from a charger of the driving robot apparatus 300. As another example, the sensor 340 may detect a remaining battery level of the driving robot apparatus 300. As another example, the sensor 340 may obtain data to be used when the driving robot apparatus 300 searches an indoor space and generates an indoor space map. The indoor space refers to an area in which the driving robot apparatus 300 may move substantially freely. As another example, the sensor 340 may obtain data to be used to identify whether the cleaning pad is attached to the driving robot apparatus 300. As another example, the sensor 340 may obtain data to be used to identify the type of the cleaning pad attached to the driving robot apparatus 300.

According to an embodiment of the disclosure, the sensor 340 may include an obstacle detection sensor 341, a position recognition sensor 343, and a pad recognition sensor 345.

The obstacle detection sensor 341 may obtain data to be used to detect an obstacle located on a traveling path of the driving robot apparatus 300. The obstacle detection sensor 341 may include at least one of an image sensor that obtains an image, a three-dimensional (3D) sensor, a lidar sensor, or an ultrasonic sensor. For example, the image sensor may obtain surrounding and/or ceiling images to be used to detect an obstacle located near the driving robot apparatus 300. The lidar sensor and/or the ultrasonic sensor may obtain data regarding a distance to the obstacle located near the driving robot apparatus 300. The 3D sensor may obtain 3D data regarding an area within a certain distance from the driving robot apparatus 300.

The position recognition sensor 343 may obtain data for recognizing the position of the driving robot apparatus 300 in the indoor space. The position recognition sensor 343 may recognize the position of the driving robot apparatus 300, based on at least one of image data, 3D data obtained by the 3D sensor, information about the distance to the obstacle, which is obtained by the lidar sensor, or strength of a communication signal received from an access point (AP) and/or a home appliance. The position recognition sensor 343 may recognize the position of the driving robot apparatus 300 in the indoor space map. The indoor space map may include data regarding at least one of a navigation map, a simultaneous localization and mapping (SLAM) map, or an obstacle recognition map.

The pad recognition sensor 345 may obtain data to be used to identify whether the cleaning pad is attached to the driving robot apparatus 300 and/or to identify the type of the cleaning pad attached to the driving robot apparatus 300. For example, the pad recognition sensor 345 may emit light to one surface of the cleaning pad and receive reflected light reflected from the cleaning pad. The pad recognition sensor 345 may emit light to the cleaning pad through an opening in the holder that fixes the cleaning pad. The pad recognition sensor 345 may receive reflected light with different intensities from two or more reflective areas of the cleaning pad with different light reflectivities.

The communication interface 350 may communicate with an external device. For example, the communication interface 350 may transmit and receive data to and from a mobile terminal (e.g., a smartphone, a laptop computer, a tablet personal computer (PC), a digital camera, an e-book terminal, or a digital broadcasting terminal), a server device, or a home appliance (e.g., a refrigerator or a washing machine). The communication interface 350 may include a Bluetooth communication interface, a Bluetooth Low Energy (BLE) communication interface, a Near Field Communication interface, a wireless local area network (WLAN) (Wi-Fi) communication interface, a ZigBee communication interface, an Infrared Data Association (IrDA) communication interface, a Wi-Fi Direct (WFD) communication interface, ultra-wideband (UWB) communication interface, an Ant+ communication interface, a mobile communication interface, etc., but the disclosure is not limited thereto.

The input/output interface 360 is a hardware module and/or device that receives a user input and outputs information. For example, the input/output interface 360 may include an output device, such as a display 361 or a speaker, an input device, such as a microphone, a keyboard, a touch pad, or a mouse, and a combination (e.g., a touchscreen) of the output device and the input device. Also, the input/output interface 360 may receive a user input of controlling the driving robot apparatus 300. The input/output interface 360 may output information about the state of the driving robot apparatus 300 and information about the operation mode of the driving robot apparatus 300.

The memory 370 may store various types of data, for example, an operating system (OS) for data processing by the processor 390 and control by the driving robot apparatus 300, programs such as applications, and files. The memory 370 may store at least one instruction and at least one program for processing and control by the processor 390.

The memory 370 may include at least one type of storage medium selected from flash memory-type memory, hard disk-type memory, multimedia card micro-type memory, card-type memory (e.g., secure digital (SD) or extreme digital (XD) memory), random access memory (RAM), static random access memory (SRAM), read-only memory (ROM), electrically erasable programmable read-only memory (EEPROM), programmable read-only memory (PROM), magnetic memory, magnetic disc, and optical disc, but the disclosure is not limited thereto.

The processor 390 controls overall operations of the driving robot apparatus 300. The processor 390 may be implemented as one or more processors. The processor 390 may execute instructions stored in the memory 370 to control overall operations of the moving assembly 310, the cleaning assembly 330, the sensor 340, the communication interface 350, the input/output interface 360, the memory 370, and the like. The processor 390 may execute programs and/or instructions to control operations of the driving robot apparatus 300 to be described with reference to FIGS. 8 to 14.

For example, the processor 390 may control the moving assembly 310 to control the traveling of the driving robot apparatus 300. The processor 390 may generate a driving signal for controlling the moving assembly 310, and may output the driving signal to the moving assembly 310. The moving assembly 310 may drive each component of the moving assembly 310, based on the driving signal output from the processor 390. The processor 390 may set the traveling path of the driving robot apparatus 300 and drive the moving assembly 310 to move the driving robot apparatus 300 along the traveling path.

As another example, the processor 390 may control the cleaning assembly 330 so that the driving robot apparatus 300 performs cleaning while traveling. The processor 390 may generate a driving signal for controlling the cleaning assembly 330, and may output the driving signal to the cleaning assembly 330. The cleaning assembly 330 may drive each component of the cleaning assembly 330, based on the driving signal output from the processor 390. The cleaning assembly 330 may control the rotation and movement of the holder that fixes the cleaning pad and the supply of water to the cleaning pad according to the drive signal output from the processor 390. The processor 390 may generate a driving signal for moving the holder that fixes the cleaning pad, so that the cleaning pad is popped out of the driving robot apparatus 300. The processor 390 may generate a driving signal for moving the holder so that the popped-out cleaning pad is popped in.

As another example, the processor 390 may process data obtained by the sensor 340. The processor 390 may process an image obtained by the sensor 340 so as to identify an obstacle from the image. The processor 390 may identify an obstacle from distance data obtained by the sensor 340. The processor 390 may generate and adjust a traveling path by using data regarding the position of the driving robot apparatus 300, which is obtained by the sensor 340.

As another example, the processor 390 may control the moving assembly 310 and the cleaning assembly 330, based on a control signal received through the communication interface 350. The processor 390 may control the moving assembly 310 so that the driving robot apparatus 300 moves to a certain area, based on a user input related to the certain area which is received through the communication interface 350, and may control the cleaning assembly 330 so that the driving robot apparatus 300 cleans the certain area.

As another example, the processor 390 may control the moving assembly 310 and the cleaning assembly 330, based on a control signal received through the input/output interface 360. The processor 390 may control the moving assembly 310 so that the driving robot apparatus 300 moves to a certain area, based on a user input related to the certain area which is input through the input/output interface 360, and may control the cleaning assembly 330 so that the driving robot apparatus 300 cleans the certain area.

As another example, the processor 390 may identify the cleaning pad from reflected light that the sensor 340 obtains from the cleaning pad. For example, the processor 390 may identify whether the cleaning pad is attached to the driving robot apparatus 300. Also, the processor 390 may identify the type of the cleaning pad attached to the driving robot apparatus 300. For example, the processor 390 may identify whether the cleaning pad is attached to the driving robot apparatus 300 by using intensity of reflected light received from the cleaning pad. As another example, the processor 390 may identify the type of the cleaning pad attached to the driving robot apparatus 300 among a plurality of types of cleaning pads by using intensity of reflected light received from the cleaning pad.

As another example, the processor 390 may determine the traveling path of the driving robot apparatus 300, based on a result of identifying whether the cleaning pad is attached to the driving robot apparatus 300. For example, the processor 390 may identify a holder from which the cleaning pad is detached among a plurality of holders to which the cleaning pads are attached. The driving robot apparatus 300 may adjust the interval of the traveling path of the driving robot apparatus 300, based on a result of identifying the holder from which the cleaning pad is detached.

As another example, the processor 390 may determine the traveling path of the driving robot apparatus 300, based on the type of the cleaning pad identified by using the reflected light received from the cleaning pad. The processor 390 may determine the traveling path so as to travel in the traveling area 1 only once, based on a result of identifying a cleaning pad including a multi-use cotton cloth. The processor 390 may determine the traveling path so as to travel in a part of the traveling area 1 twice or more times, based on a result of identifying a cleaning pad including a disposable non-woven fabric.

As another example, the processor 390 may control the amount of water to be supplied to the cleaning pad, based on whether the cleaning pad is attached to the holder. For example, the processor 390 may control the amount of water to be supplied to the holder from which the cleaning pad is detached among the holders to which the cleaning pads are attached. As another example, the processor 390 may control the amount of water to be supplied to the cleaning pad, based on the type of the cleaning pad. Specifically, the processor 390 may supply a first amount of water to the cleaning pad including a disposable non-woven fabric every first time. The processor 390 may supply a second amount of water to the cleaning pad including a multi-use cotton cloth every second time.

Figure 4:
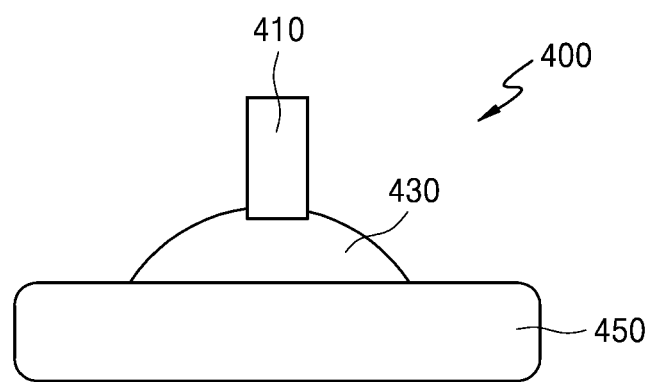
FIG. 4 is a diagram illustrating a structure of a rotary pad assembly of a driving robot apparatus, according to an embodiment of the disclosure.

FIG. 4 is a diagram illustrating a structure of a rotary pad assembly of a driving robot apparatus, according to an embodiment of the disclosure. The driving robot apparatus may clean the floor by using a rotary pad assembly 400.

Referring to FIG. 4, the rotary pad assembly 400 may include a cleaning pad 450, a holder 430, and a rotary motor (not illustrated).

The rotary motor (not illustrated) connected to a rotational shaft 410 applies rotation to the cleaning pad 450 in order to clean the traveling path of the driving robot apparatus. The rotary motor (not illustrated) connected to the rotational shaft 410 may apply rotation to the cleaning pad 450 by applying rotation to a holder 430 that fixes the cleaning pad 450. The rotary motor (not illustrated) connected to the rotational shaft 410 may rotate the rotational shaft 410 in uni-direction or bi-direction, based on a drive signal generated by a processor of the driving robot apparatus. For example, the rotary motor (not illustrated) may rotate according to a driving signal including a rotating direction determined based on positions of an obstacle and the rotational shaft 410/the cleaning pad 450.

The holder 430 fixes the cleaning pad 450. For example, the holder 430 may have a lower portion made of Velcro, and may be coupled to the cleaning pad 450 having an upper portion made of Velcro. The holder 430 may be connected to the rotational shaft 410, so that rotational force applied from the rotary motor (not illustrated) is transmitted to the cleaning pad 450. The holder 430 may have a disk shape.

The holder 430 may include an opening through which light emitted to the cleaning pad 450 passes.

The cleaning pad 450 is a pad that cleans the traveling path of the driving robot apparatus. The holder 450 may have a disk shape. A diameter of the cleaning pad 450 may be greater than a diameter of the holder 430. The cleaning pad 450 performs water cleaning in such a manner that the upper surface of the cleaning pad 450 absorbs supplied water and the lower surface of the cleaning pad 450 swipes the floor by using the absorbed water. The cleaning pad 450 may include the upper surface and the lower surface respectively including different materials from each other. The cleaning pad 450 may include a first member constituting an upper portion, a second member constituting a lower portion, and an outer portion that surrounds and couples the circumferences of the upper and lower portions to each other. The cleaning pad 450 may include two or more reflective areas with different light reflectivities from each other. A portion of the center of the cleaning pad 450 may be an opening.

Figure 5A:
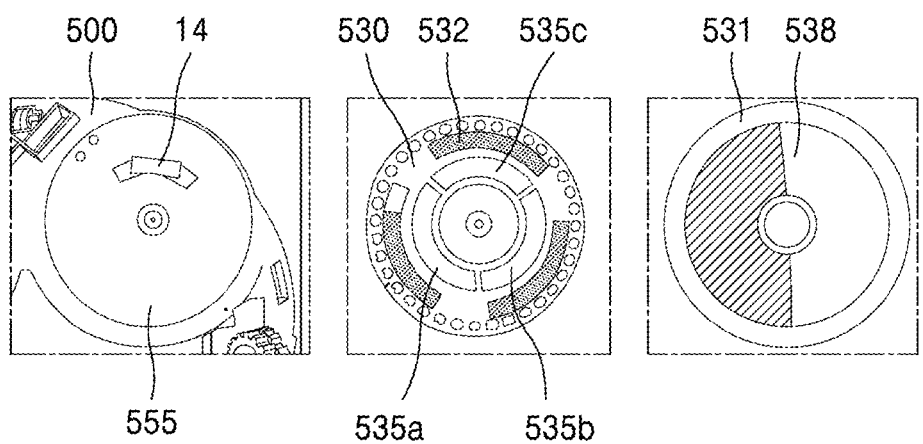
FIGS. 5A to 5C are diagrams illustrating a structure of a rotary pad assembly of a driving robot apparatus, which identifies a cleaning pad, according to an embodiment of the disclosure.
Figure 5B:
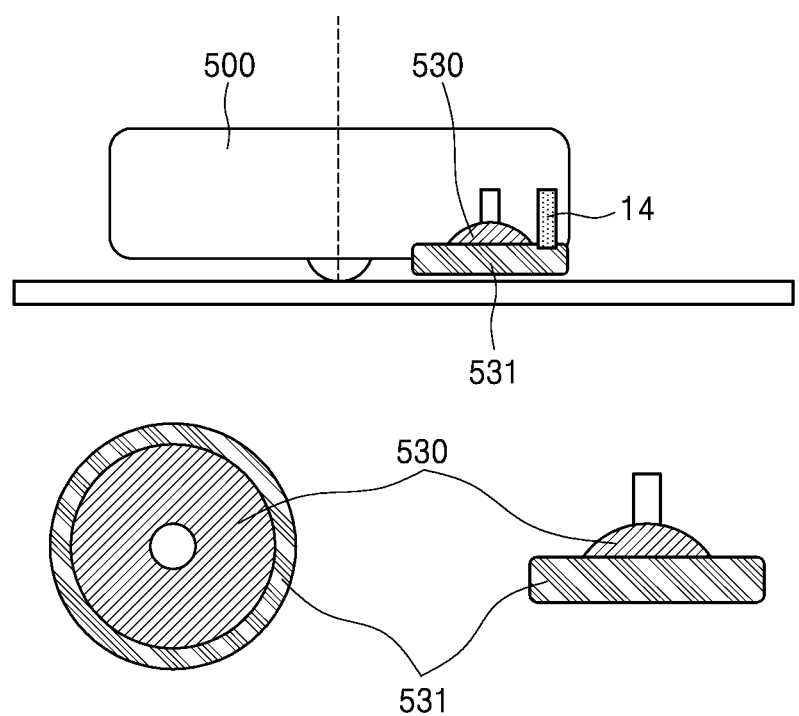
Figure 5C:
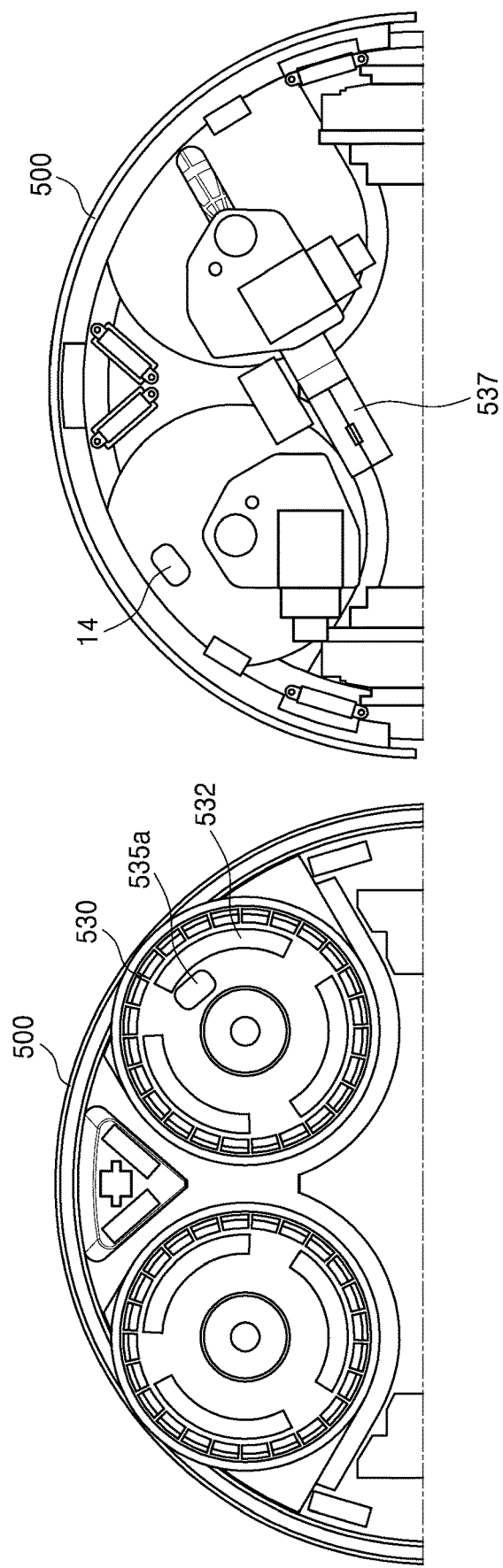

FIGS. 5A to 5C are diagrams illustrating a structure of a rotary pad assembly of a driving robot apparatus, which identifies a cleaning pad, according to an embodiment of the disclosure.

Referring to FIG. 5A, a rotary pad assembly of a driving robot apparatus 500 may include a holder 530 that fixes a cleaning pad. The holder 530 may transmit, to the cleaning pad, rotational force applied from a rotary motor. The holder 530 may have a disk shape having a diameter less than a diameter of the cleaning pad.

According to an embodiment of the disclosure, the holder 530 may include a fixing member 532 that fixes the cleaning pad. For example, the fixing member 532 may be Velcro. The holder 530 may have a lower portion made of Velcro, and may be coupled to the cleaning pad 531 having an upper portion made of Velcro.

According to an embodiment of the disclosure, the holder 530 may include one or more openings 535a, 535b, and 535c. An optical signal emitted to the cleaning pad and reflected light reflected from the cleaning pad may pass through the openings 535a, 535b, and 535c.

According to an embodiment of the disclosure, the cleaning pad 531 may include a fixing member, such as a non-woven fabric that may be attached to the Velcro of the holder 530 on the surface (surface attached to the holder, hereinafter referred to as a reflective surface 538) opposite to the cleaning surface (surface in contact with the floor). Accordingly, the cleaning pad 531 may be attached to the holder 530.

Also, the reflective surface 538 of the cleaning pad 531 may include two or more reflective areas with different reflectivities from each other. For example, as illustrated in FIG. 5A, the reflective surface of the cleaning pad 531 may have a black semicircular area and a white semicircular area.

According to an embodiment of the disclosure, the driving robot apparatus 500 may include an optical sensor 14 in an area 555 to which the cleaning pad 531 and the holder 530 are attached. An optical signal output from the optical sensor 14 may be emitted to the reflective surface 538 of the cleaning pad 531 through the openings 535a, 535b, and 535c of the holder 530. An optical signal reflected from the reflective surface 538 of the cleaning pad 531 may be received by the optical sensor 14 through the openings 535a, 535b, and 535c of the holder 530.

FIG. 5B is a side view of the driving robot apparatus 500. The driving robot apparatus 500 may include an optical sensor 14, a holder 530, and a cleaning pad 531. The driving robot apparatus 500 may determine whether the cleaning pad 531 is attached, based on a change in an optical signal reflected from the reflective area of the reflective surface of the cleaning pad 531.

Referring to FIG. 5C, a rotary pad assembly of the driving robot apparatus 500 may include a holder 530 that fixes a cleaning pad. The holder 530 may transmit, to the cleaning pad, rotational force applied from a rotary motor. The holder 530 may have a disk shape having a diameter less than a diameter of the cleaning pad.

According to an embodiment of the disclosure, the holder 530 may include a fixing member 532 that fixes the cleaning pad. For example, the holder 530 may have a lower portion made of Velcro, and may be coupled to the cleaning pad having an upper portion made of Velcro.

According to an embodiment of the disclosure, the holder 530 may include one or more openings 535a. An optical signal output from the optical sensor 14 emitted to the cleaning pad and reflected light reflected from the cleaning pad may pass through the openings 535a.

According to an embodiment of the disclosure, the driving robot apparatus 500 may pop out the cleaning pad in order to clean a space between the obstacle and the bottom of the driving robot apparatus 500. The driving robot apparatus 500 may pop out the cleaning pad so that the cleaning pad protrudes outward from the driving robot apparatus 500. The driving robot apparatus 500 may pop out the cleaning pad by using a guide 537. The guide 537 may be connected to a holder to which the cleaning pad is attached, and the driving robot apparatus 500 may move the holder along the guide 537 in a certain direction. FIG. 5C illustrates an embodiment of the disclosure in which only one cleaning pad among a plurality of cleaning pads is popped out, but the disclosure is not limited thereto. It is apparent to those of ordinary skill in the art that a rotary pad assembly may be configured so that each of the cleaning pads is popped out by adjusting the position, length, direction, etc. of the guide 537.

According to an embodiment of the disclosure, the guide 537 may include a rail, and the holder may include a moving module that moves along the rail. The driving robot apparatus 500 may control the holder to move to a preset position along the rail. For example, the driving robot apparatus 500 may control the holder to move to the preset position by applying a driving signal of a linear motor connected to the moving module of the holder.

According to an embodiment of the disclosure, the driving robot apparatus 500 may pop out the cleaning pad by using an arm having one side connected to the driving robot apparatus 500 and the other side connected to the holder that fixes the cleaning pad. For example, the driving robot apparatus 500 may pop out the cleaning pad by rotating the other side of the arm, to which the cleaning pad is fixed, toward the outside of the driving robot apparatus 500 with the one side of the arm connected to the driving robot apparatus 500 as the center of the rotation axis.

Figure 6:
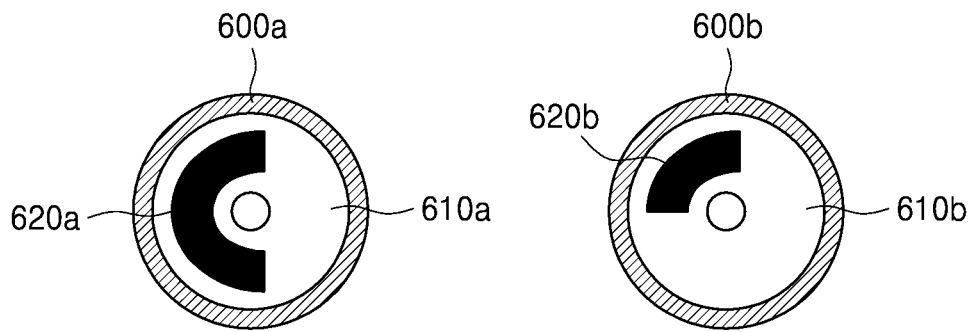
FIG. 6 is a diagram illustrating a cleaning pad according to an embodiment of the disclosure.

FIG. 6 is a diagram illustrating a cleaning pad according to an embodiment of the disclosure.

Referring to FIG. 6, reflective surfaces of a cleaning pad 600a may include reflective areas 610a and 620a, and reflective surfaces of a cleaning pad 600b may include reflective areas 610b and 620b. The reflective surfaces may be upper surfaces of the cleaning pads 600a and 600b. The reflective areas 610a, 610b, 620a, and 620b may each have a disk shape, or may each have a fan shape (annulus sector) without some vertices.

The reflective surfaces may include a plurality of reflective areas with different light reflectivities from each other. For example, the reflective surfaces may include first reflective areas 610a and 610b and second reflective areas 620a and 620b. It is apparent to those of ordinary skill in the art that various combinations of the first reflective areas 610a and 610b and the second reflective areas 620a and 620b are possible.

According to an embodiment of the disclosure, the reflective areas 610a, 610b, 620a, and 620b of the cleaning pads 600a and 600b may have different light reflectivities from each other. For example, the cleaning pads 600a and 600b may include the first reflective areas 610a and 610b with first light reflectivity and the second reflective areas 620a and 620b with second light reflectivity. Specifically, the cleaning pads 600a and 600b may include the first reflective areas 610a and 610b including a material with high light reflectivity and the second reflective areas 620a and 620b with low light reflectivity.

According to an embodiment of the disclosure, the first reflective areas 610a and 610b and the second reflective areas 620a and 620b may correspond to openings of a holder. Accordingly, optical signals may be emitted to the first reflective areas 610a and 610b and the second reflective areas 620a and 620b of the rotating cleaning pads 600a and 600b through the openings of the holder. The first reflective areas 610a and 610b and the second reflective areas 620a and 620b may reflect the optical signals, respectively emitted thereto. As the cleaning pad rotates, the intensity of first reflected light generated from the first reflective areas 610a and 610b may be different from the intensity of second reflected light generated from the second reflective areas 620a and 620b. For example, the intensity of the first reflected light reflected from the first reflective areas 610a and 610b including a material with high light reflectivity may be strong, and the intensity of the second reflected light reflected from the second reflective areas 620a and 620b including a material with low light reflectivity may be weak. Accordingly, the rotating cleaning pads 600a and 600b may generate pieces of reflected light with different intensities at certain time intervals in response to the optical signals emitted thereto. Accordingly, the driving robot apparatus may identify whether the cleaning pads 600a and 600b are attached to the holder to which the optical signal is emitted, based on the cycle of the intensity of the reflected light.

For example, the driving robot apparatus may determine whether the intensity of the reflected light indicates a preset cycle for a reference time. When the intensity of the reflected light indicates the preset cycle for the reference time, the driving robot apparatus may determine that the cleaning pads 600a and 600b are attached to the holder to which the optical signal is emitted. Also, when the intensity of the reflected light does not indicate the preset cycle for the reference time, the driving robot apparatus may determine that the cleaning pads 600a and 600b are not attached to the holder to which the optical signal is emitted. The preset cycle may be a rotation cycle of the holder and may be a multiple of the rotation cycle of the holder. According to an embodiment of the disclosure, the cleaning pads 600a and 600b may include the first reflective areas 610a and 610b and the second reflective areas 620a and 620b having different configurations from each other according to the types of the cleaning pads 600a and 600b. For example, the cleaning pads 600a and 600b may include the first reflective areas 610a and 610b and the second reflective areas 620a and 620b having different areas from each other for each type. As another example, the cleaning pads 600a and 600b may have different shapes of the first reflective areas 610a and 610b and/or the second reflective areas 620a and 620b for each type. As a specific example, in the case of the cleaning pad 600a including a multi-use cotton cloth, the second reflective area 620a may have a half disk shape, and in the case of the cleaning pad 600b including a disposable non-woven fabric, the second reflective area 620b may have a fan shape (annulus sector) without some vertices. Accordingly, the driving robot apparatus may identify the types of the cleaning pads 600a and 600b attached to the holder to which the optical signal is emitted, based on a waveform of the intensity of the reflected light. For example, when the driving robot apparatus determines that the waveform of the intensity of the reflected light is a first waveform, the driving robot apparatus may determine that the multi-use cotton cloth is attached to the holder to which the optical signal is emitted. When the driving robot apparatus determines that the waveform of the intensity of the reflected light is a second waveform, the driving robot apparatus may determine that the non-woven fabric is attached to the holder to which the optical signal is emitted.

Figure 7:
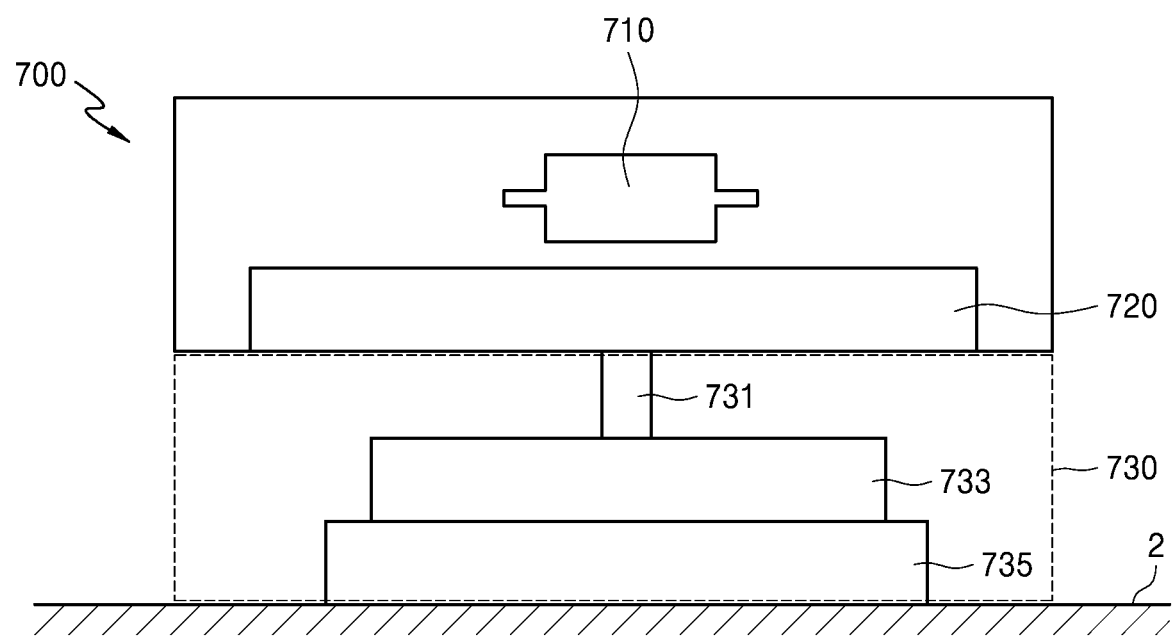
FIG. 7 is a diagram illustrating a structure of a driving robot apparatus, according to an embodiment of the disclosure.

FIG. 7 is a diagram illustrating a structure of a driving robot apparatus, according to an embodiment of the disclosure.

Referring to FIG. 7, a driving robot apparatus 700 may include a sensor 710, a base 720, and a rotary pad assembly 730.

The base 720 is the lower surface of the exterior of the driving robot apparatus 700. The base 720 may fix the rotary pad assembly 730. The base 720 may be spaced apart from a floor 2 by a certain distance to protect the inside of the driving robot apparatus 700 from foreign materials present on the floor 2. For example, the base 720 may protect the sensor 710 located inside the driving robot apparatus 700.

The rotary pad assembly 730 may include a cleaning pad 735 that cleans the floor 2, a holder 733 that fixes the cleaning pad 735, and a rotary motor (not illustrated) that rotates the holder 733. Also, the rotary motor (not illustrated) may be connected to a rotational shaft 731.

A lower portion of the holder 733 may be made of Velcro. The holder 733 may use the Velcro of the lower portion for connection to the cleaning pad 735 having an upper portion made of Velcro. The holder 733 may be connected to the rotational shaft 731, so that rotational force applied from the rotary motor (not illustrated) is transmitted to the cleaning pad 735.

The cleaning pad 735 may include two or more reflective areas with different light reflectivities from each other. For example, the cleaning pad 735 may include a first reflective area including a material with high light reflectivity and a second reflective area including a material with low light reflectivity.

The base 720 and the holder 733 may each include an opening through which an optical signal passes. The sensor 710 may scan an optical signal to the upper surface of the rotating cleaning pad 735. The sensor 710 may receive reflected light from the upper surface of the cleaning pad 735. For example, the sensor 710 may receive reflected light with different intensities from the cleaning pad 735 including two or more reflective areas with different light reflectivities in each certain cycle. The sensor 710 may generate data regarding intensity of the received reflected light.

Figure 8:
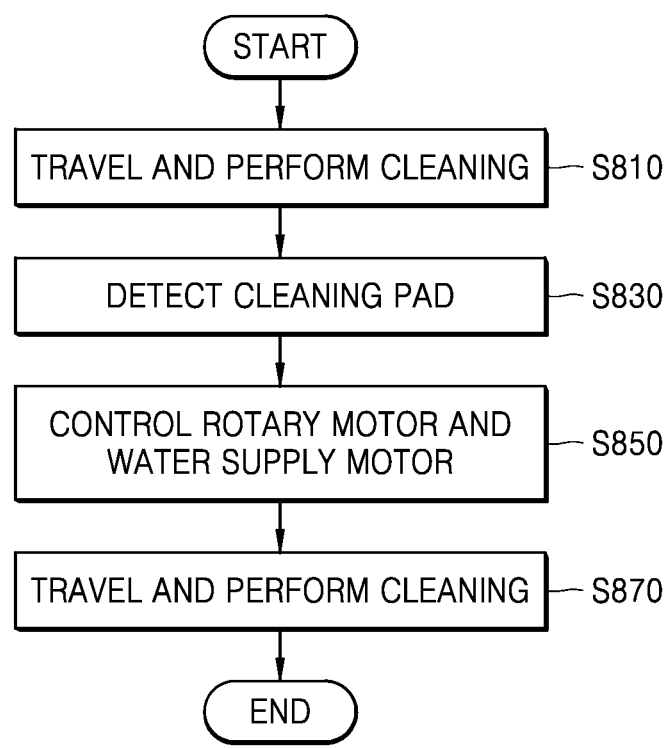
FIG. 8 is a flowchart of a control method of a driving robot apparatus, according to an embodiment of the disclosure.

FIG. 8 is a flowchart of a control method of a driving robot apparatus, according to an embodiment of the disclosure. Each operation of the control method of FIG. 8 may be configured with one or more instructions to be executed by the driving robot apparatus, and may be stored in a recording medium.

In operation S810, a driving robot apparatus travels and performs cleaning.

The driving robot apparatus may perform cleaning by using a cleaning pad while traveling. For example, the driving robot apparatus may clean a certain area with a wet mop while traveling in the certain area, based on a user input received through an input/output interface. As another example, the driving robot apparatus may travel in and clean a certain area, based on a control signal received from an external device (e.g., a server, a mobile terminal, etc.) through a communication interface. As another example, the driving robot apparatus may travel in and clean a certain area, based on a control signal for starting traveling and cleaning at a preset time.

In operation S830, the driving robot apparatus detects a cleaning pad.

According to an embodiment of the disclosure, the driving robot apparatus may use a sensor to detect the cleaning pad by emitting an optical signal to the cleaning pad and receiving reflected light from the cleaning pad. For example, the driving robot apparatus may detect the cleaning pad by identifying the intensity of the optical signal received from the cleaning pad including two or more reflective areas with different light reflectivities.

According to an embodiment of the disclosure, the driving robot apparatus may identify whether the cleaning pad is attached to or detached from a holder, based on a change in intensity of the received reflected light. For example, the driving robot apparatus may identify whether the cleaning pad is attached to or detached from the holder by using the standard deviation of the intensity of the reflected light. When the standard deviation of the intensity of the reflected light is within a certain range, the driving robot apparatus may identify that the cleaning pad is attached to the holder. As another example, when there is no change in intensity of the reflected light, the driving robot apparatus may identify that the cleaning pad has been detached from the holder. As another example, when the change in intensity of the reflected light is not constant, the driving robot apparatus may identify that the cleaning pad has been detached from the holder. The driving robot apparatus may identify whether a cleaning pad is attached to or detached from each of a plurality of holders to which cleaning pads are attached.

According to an embodiment of the disclosure, the driving robot apparatus may identify a type of a pad attached to a holder among a plurality of types of pads, based on a change in intensity of the received reflected light. The driving robot apparatus may identify the type of the pad attached to the holder, based on a result of comparing data regarding a change in intensity of reflected light of each of the types of the pads with data regarding a change in intensity of reflected light obtained by using a sensor. For example, the driving robot apparatus may identify the type of the pad attached to the holder, based on a result of comparing first standard deviation of intensity of reflected light of each of the types of the pads with second standard deviation of intensity of reflected light obtained by using a sensor. As another example, the driving robot apparatus may identify the type of the pad attached to the holder, based on a result of comparing a first change cycle of intensity of reflected light of each of the types of the pads with a second change cycle of intensity of reflected light obtained by using a sensor. As another example, the driving robot apparatus may identify the type of the pad attached to the holder, based on a result of comparing a first graph showing a change in intensity of reflected light of each of the types of the pads with a second graph showing a change in intensity of reflected light obtained by using a sensor. The driving robot apparatus may identify the type of the pad by using data regarding changes in intensity of reflected light of the types of the pads, which is stored in a memory. The driving robot apparatus may identify the type of the pad by using data regarding changes in intensity of reflected light of the types of the pads, which is received from a cloud server.

When the cleaning pad is detached, the driving robot apparatus may use an input/output interface to output a notification that the cleaning pad is detached. For example, the driving robot apparatus may use a display to output a preset color. As another example, the driving robot apparatus may output a certain notification sound. When the cleaning pad is detached, the driving robot apparatus may transmit, to a user's mobile device, data indicating that the cleaning pad has been detached. A user may recognize through a notification of the mobile device that the cleaning pad has been detached.

In operation S850, the driving robot apparatus controls a rotary motor and a water supply motor.

According to an embodiment of the disclosure, the driving robot apparatus may control the rotary motor, based on a result of identifying that the cleaning pad is detached from the holder. The driving robot apparatus may control the rotary motor connected to the holder from which the cleaning pad is detached among the holders to which the cleaning pads are attached. For example, the driving robot apparatus may control the rotary motor so that the rotary motor connected to the holder from which the cleaning pad is detached does not rotate. Also, the driving robot apparatus may pop in the holder when the cleaning pad of the popped-out holder is detached.

According to an embodiment of the disclosure, the driving robot apparatus may control the rotary motor, based on the type of the cleaning pad attached to the holder. The driving robot apparatus may adjust the load of the rotary motor according to the type of the identified cleaning pad by using data regarding the proper load of the rotary motor according to the type of each of the cleaning pads. For example, the driving robot apparatus may control the rotary motor to rotate with a first load, based on a result of identifying a cleaning pad including a disposable non-woven fabric attached to the holder. As another example, the driving robot apparatus may control the rotary motor to rotate with a second load, based on a result of identifying a cleaning pad including a multi-use cotton cloth attached to the holder.

According to an embodiment of the disclosure, the driving robot apparatus may control the water supply motor, based on a result of identifying that the cleaning pad is detached from the holder. For example, the driving robot apparatus may control the water supply motor so that water is not supplied to the holder from which the cleaning pad is detached among the holders to which the cleaning pads are attached.

According to an embodiment of the disclosure, the driving robot apparatus may control the water supply motor, based on the type of the cleaning pad attached to the holder. The driving robot apparatus may control the water supply motor to supply a preset amount of water in a preset cycle according to the type of the identified cleaning pad by using data regarding water absorbency of each of the types of the cleaning pads. For example, the driving robot may control the water supply motor to supply a first amount of water to the cleaning pad in a first cycle, based on a result of identifying a cleaning pad including a disposable non-woven fabric attached to the holder. As another example, the driving robot apparatus may control the water supply motor to supply a second amount of water to the cleaning pad in a first cycle, based on a result of identifying a cleaning pad including a multi-use cotton cloth attached to the holder.

In operation S870, the driving robot apparatus travels and performs cleaning.

According to an embodiment of the disclosure, based on a result of detecting that the cleaning pad is attached to the holder in operation S830, the driving robot apparatus continuously travels along the travel path and performs cleaning by supplying water to the cleaning pad.

According to an embodiment of the disclosure, based on a result of detecting that only some cleaning pads have been detached, the driving robot apparatus may perform cleaning by using the attached cleaning pads and adjust the traveling path and/or the interval of the traveling path. When all the cleaning pads are detached, the driving robot apparatus may travel to return to a charger.

According to an embodiment of the disclosure, the driving robot apparatus may travel and perform cleaning while rotating the cleaning pad with the load of the rotary motor corresponding to the type of the cleaning pad detected in operation S830.

Operations S810 to S870 may be performed in each preset cycle or when a preset condition is satisfied.

According to an embodiment of the disclosure, the driving robot apparatus may easily identify whether the cleaning pad is detached and the type of the cleaning pad attached to the driving robot apparatus, and may flexibly control the rotary motor and the water supply motor, based on a result of the identifying.

Figure 9:
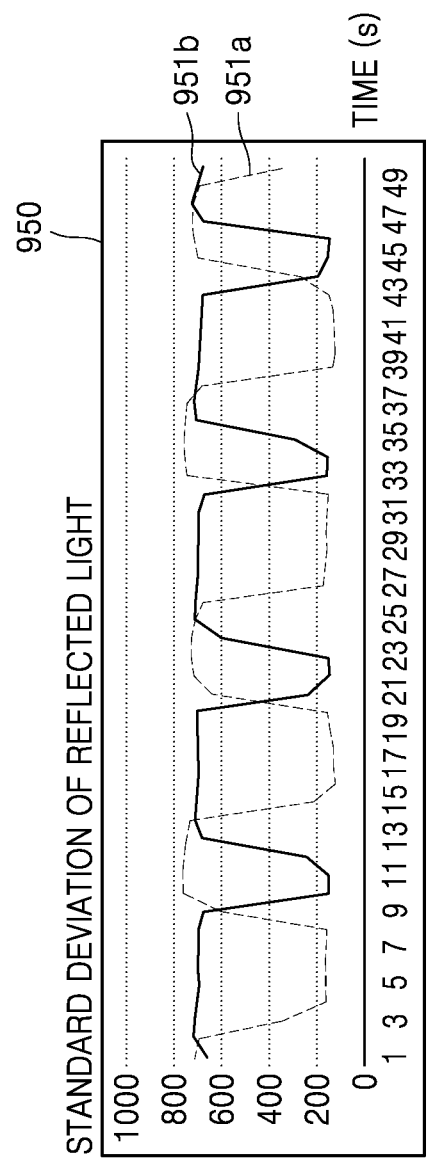
FIG. 9 is a diagram illustrating standard deviation of reflected light according to one surface of a cleaning pad, according to an embodiment of the disclosure.

FIG. 9 is a diagram illustrating standard deviation of reflected light according to one surface of a cleaning pad, according to an embodiment of the disclosure.

Referring to FIG. 9, cleaning pads 910a and 910b may include two or more reflective areas with different light reflectivities from each other. For example, the cleaning pad 735 may include a first reflective area including a material with high light reflectivity and a second reflective area including a material with low light reflectivity. The cleaning pads 910a and 910b may have different first reflective areas or second reflective areas in order to distinguish types thereof. For example, the first cleaning pad 910a may include a multi-use cotton fabric, and the second cleaning pad 910b may include a disposable non-woven fabric. The width and/or shape of the second reflective area of the first cleaning pad 910a may be different from the width and/or shape of the second reflective area of the second cleaning pad 910b. For example, in the case of the cleaning pad 910a including a multi-use cotton cloth, the second reflective area may have a half disk shape, and in the case of the cleaning pad 910b including a disposable non-woven fabric, the second reflective area may have a fan shape (annulus sector) without some vertices.

The driving robot apparatus may emit optical signals to the cleaning pads 910a and 910b and may receive reflected light from the cleaning pads 910a and 910b. The driving robot apparatus may receive reflected light with strong intensity from the first reflective area and reflected light with weak intensity from the second reflective area.

The intensity of reflected light generated from the cleaning pads 910a and 910b may be represented by a diagram 950 accumulated over time. In the diagram 950, the horizontal axis represents the time, and the vertical axis represents the intensity of reflected light. The intensity of reflected light generated from the first cleaning pad 910a over time may be represented by a first graph 951a. The intensity of reflected light generated from the second cleaning pad 910b over time may be represented by a second graph 951b. In the first graph 951a and the second graph 951b, high points and low points are repeated in each certain cycle. The low points of the first graph 951a and the second graph 951b indicate the intensity of reflected light generated from the second reflective area, and the high points of the first graph 951a and the second graph 951b indicate the intensity of reflected light generated from the first reflective area. The area of the second reflective area with low light reflectivity in the first cleaning pad 910a is greater than the area of the second reflective area of the second cleaning pad 910b. Accordingly, the first graph 951a is different from the second graph 951b. Specifically, the low point of the second graph 951b may have a duration shorter than that of the first graph 951a, and the high point of the second graph 951b may have a duration longer than that of the first graph 951a.

The driving robot apparatus may identify the cleaning pad, based on the intensity of reflected light generated from the cleaning pads 910a and 910b.

According to an embodiment of the disclosure, the driving robot apparatus may identify the cleaning pad, based on a low point value and a high point value of the intensity of reflected light for a certain time. The driving robot apparatus may identify the type of the cleaning pad, based on a result of comparing data regarding the low point value and the high point value of the intensity of reflected light of each of the types of the cleaning pads with the low point value and the high point value of the intensity of reflected light obtained from the cleaning pads 910a and 910b. Comparing the first graph 951a with the second graph 951b, the low point value of the intensity of reflected light obtained from the first cleaning pad 910a is lower than the low point value of the intensity of reflected light obtained from the second cleaning pad 910b. The high point value of the intensity of reflected light obtained from the first cleaning pad 910a is higher than the high point value of the intensity of reflected light obtained from the second cleaning pad 910b. Accordingly, the driving robot apparatus may identify the types of the cleaning pads 910a and 910b by taking into account the difference between the low point value and the high point value of the intensity of reflected light obtained from the cleaning pads 910a and 910b.

According to an embodiment of the disclosure, the driving robot apparatus may identify the cleaning pad, based on the time for which the intensity of reflected light remains below a first threshold value within a certain time and/or the time for which the intensity of reflected light remains above a second threshold value. The driving robot apparatus may identify the type of the cleaning pad, based on a result of comparing data regarding the time for which the intensity of reflected light of each of the types of the cleaning pads remains below the first threshold value and/or the time for which the intensity of reflected light remains above the second threshold value with the time for which the intensity of reflected light obtained from the cleaning pads 910a and 910b remains below the first threshold value and/or the time for which the intensity of reflected light obtained from the cleaning pads 910a and 910b remains above the second threshold value. Comparing the first graph 951a with the second graph 951b, a first time for which the intensity of reflected light obtained from the first cleaning pad 910a remains lower than 200 mV is longer than a second time for which the intensity of reflected light obtained from the second cleaning pad 910b remains lower than 200 mV. A third time for which the intensity of reflected light obtained from the first cleaning pad 910a remains higher than 600 mV is longer than a fourth time for which the intensity of reflected light obtained from the second cleaning pad 910b remains higher than 600 mV. Therefore, the driving robot apparatus may identify the types of the cleaning pads 910a and 910b by taking into account the difference between the time for which the intensity of reflected light obtained from the cleaning pads 910a and 910b remains below the first threshold value and/or the time for which the intensity of reflected light obtained from the cleaning pads 910a and 910b remains above the second threshold value.

According to an embodiment of the disclosure, the driving robot apparatus may identify the cleaning pad, based on the standard deviation of the intensity of reflected light for a certain time. The driving robot apparatus may identify the type of the cleaning pad, based on a result of comparing data regarding the standard deviation of the intensity of reflected light of each of the types of the cleaning pads with the standard deviation of the intensity of reflected light obtained from the cleaning pads 910a and 910b. The standard deviation of the intensity of the first reflected light confirmed from the first graph 951a is 281.4. The standard deviation of the intensity of the second reflected light confirmed from the second graph 951b is 97.9. Accordingly, the driving robot apparatus may identify the types of the cleaning pads 910a and 910b by taking into account the standard deviation of the intensity of reflected light obtained from the cleaning pads 910a and 910b.

Figure 10:
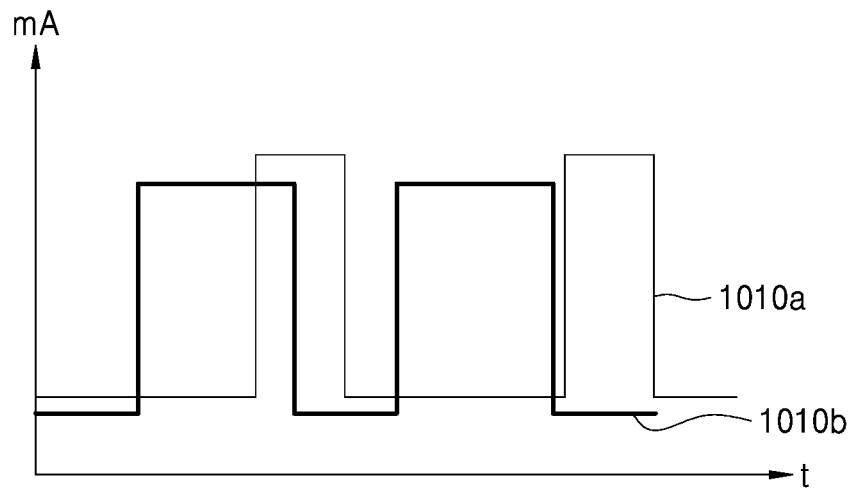
FIG. 10 is a diagram illustrating a water supply amount according to a type of a cleaning pad, according to an embodiment of the disclosure.

FIG. 10 is a diagram illustrating a water supply amount according to a type of a cleaning pad, according to an embodiment of the disclosure. In FIG. 10, the horizontal axis represents the time, and the vertical axis represents the load current value of the water supply motor.

Referring to FIG. 10, a first graph 1010b shows a change in load current of the water supply motor that supplies water to the first cleaning pad, and a second graph 1010a shows a change in load current of the water supply motor that supplies water to the second cleaning pad. When the driving robot apparatus supplies water to the cleaning pad, the load current of the water supply motor is high.

The driving robot apparatus may control the water supply motor to differently supply water to the types of the cleaning pads. For example, the driving robot apparatus may control the water supply motor to differently supply water to the first cleaning pad including the multi-use cotton cloth and the second cleaning pad including the disposable non-woven fabric. Because the first cleaning pad including the multi-use cotton cloth is thick and has high water content, a large amount of water has to be supplied to the first cleaning pad so as to wet the first cleaning pad sufficiently. Because the second cleaning pad including the disposable non-woven fabric is tough, high water pressure has to be supplied so as to wet the second cleaning pad sufficiently.

Because the first cleaning pad including the multi-use cotton cloth consumes a lot of water while cleaning the floor, the driving robot apparatus may repeatedly supply water to the first cleaning pad at short intervals. Referring to the first graph 1010b, the driving robot apparatus may supply water to the first cleaning pad in a second cycle during a first duration. The first duration is the time equal to or longer than a certain time, and the second cycle is the time equal to or less than the certain time.

Because the second cleaning pad consumes little water while cleaning the floor, the driving robot apparatus may repeatedly supply water to the second cleaning pad at long intervals. Referring to the second graph 1010a, the driving robot apparatus may supply water to the second cleaning pad in a fourth cycle during a third duration. The third duration is the time equal to or longer than a certain time, and the fourth cycle is the time equal to or less than the certain time.

According to an embodiment of the disclosure, the driving robot apparatus may efficiently supply water according to the type of the cleaning pad.

Figure 11:
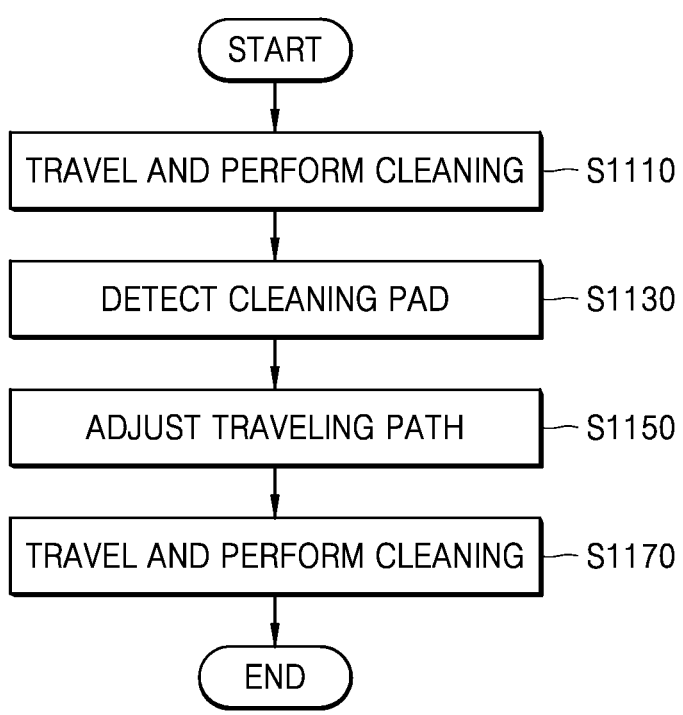
FIG. 11 is a flowchart of a control method of a driving robot apparatus, according to an embodiment of the disclosure.

FIG. 11 is a flowchart of a control method of a driving robot apparatus, according to an embodiment of the disclosure. Each operation of the control method of FIG. 11 may be configured with one or more instructions to be executed by the driving robot apparatus, and may be stored in a recording medium.

In operation S1110, the driving robot apparatus travels and performs cleaning.

The driving robot apparatus may start traveling and cleaning, based on a control command. Because operation S1110 is similar to operation S810, a redundant description thereof is omitted.

In operation S1130, the driving robot apparatus detects a cleaning pad.

The driving robot apparatus may detect the cleaning pad, based on reflected light received from the rotating cleaning pad. The driving robot apparatus may identify whether the cleaning pad is detached from the holder. The mobile robot apparatus may identify the type of the cleaning pad attached to the holder. Because operation S1130 is similar to operation S830, a redundant description thereof is omitted.

In operation S1150, the driving robot apparatus adjusts the traveling path.

According to an embodiment of the disclosure, the driving robot apparatus may determine the traveling path, based on a result of detecting whether the cleaning pad is attached to the holder in operation S1130. For example, based on a result of detecting that only some cleaning pads have been detached, the driving robot apparatus may perform cleaning by using the attached cleaning pads and adjust the traveling path and/or the interval of the traveling path. The driving robot apparatus may travel by reducing the interval of the traveling path to less than half. When all the cleaning pads are detached, the driving robot apparatus may travel to return to a charger.

According to an embodiment of the disclosure, the driving robot apparatus may determine the traveling path, based on the type of the cleaning pad detected in operation S1130. The cleaning pad including the disposable non-woven fabric may not have sufficient floor cleaning performance because of low water content thereof. Therefore, based on the result of identifying the cleaning pad including the disposable non-woven fabric, the driving robot apparatus may adjust the traveling path so as to re-travel in and re-clean the area where the driving robot apparatus has already traveled.

In operation S1170, the driving robot apparatus travels and performs cleaning.

The driving robot apparatus may travel along the traveling path adjusted in operation S1150. When some cleaning pads are detached, the driving robot apparatus may perform cleaning by using the cleaning pads attached to the driving robot apparatus.

The driving robot apparatus may travel along the travel path adjusted in operation S1150 while rotating the cleaning pad with the load of the rotary motor corresponding to the detected type of the cleaning pad.

Operations S1110 to S1170 may be performed in each preset cycle or when a preset condition is satisfied.

According to an embodiment of the disclosure, the driving robot apparatus may easily identify whether the cleaning pad is detached and the type of the cleaning pad attached to the driving robot apparatus, and may flexibly adjust the traveling path, based on a result of the identifying.

Figure 12:
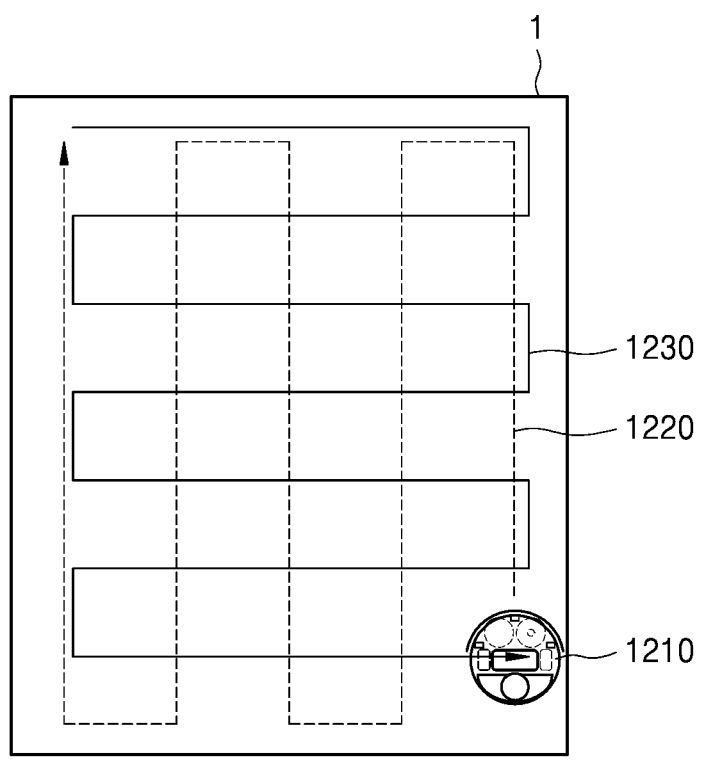
FIG. 12 is a diagram illustrating a method by which a driving robot apparatus adjusts a traveling path, according to an embodiment of the disclosure.

FIG. 12 is a diagram illustrating a method by which a driving robot apparatus adjusts a traveling path, according to an embodiment of the disclosure. A driving robot apparatus 1210 may clean a certain area 1 while traveling.

Referring to FIG. 12, the driving robot apparatus 1210 may travel in a zigzag manner within the certain area 1 along a first traveling path 1220. The first traveling path 1220 may be a preset path. For example, the first traveling path 1220 may be set based on a user input received through an input/output interface. As another example, the first traveling path 1220 may be set based on a control signal received from an external device (e.g., a server, a mobile terminal, etc.) through a communication interface.

According to an embodiment of the disclosure, the driving robot apparatus 1210 may adjust the traveling path according to the type of the cleaning pad. Because the cleaning performance of the driving robot apparatus 1210 varies depending on the material of the cleaning pad, the driving robot apparatus 1210 may adjust the traveling path so that the driving robot apparatus 1210 performs additional traveling according to the identified type of the cleaning pad. For example, the driving robot apparatus 1210 may travel along only the first traveling path 1220 by using the cleaning pad including a multi-use cotton cloth. Based on a result of identifying the cleaning pad including a disposable nonwoven fabric, the driving robot apparatus 1210 may adjust the traveling path so that the driving robot apparatus 1210 additionally travels along a second traveling path 1230 after traveling along the first traveling path 1220. The first traveling path 1220 and the second traveling path 1230 may overlap each other in a grid. The driving robot apparatus 1210 may clean the certain area 1 while traveling in a zigzag manner along the second traveling path 1230.

According to an embodiment of the disclosure, the driving robot apparatus 1210 may perform cleaning by flexibly adjusting the traveling path according to the type of the cleaning pad.

Figure 13:
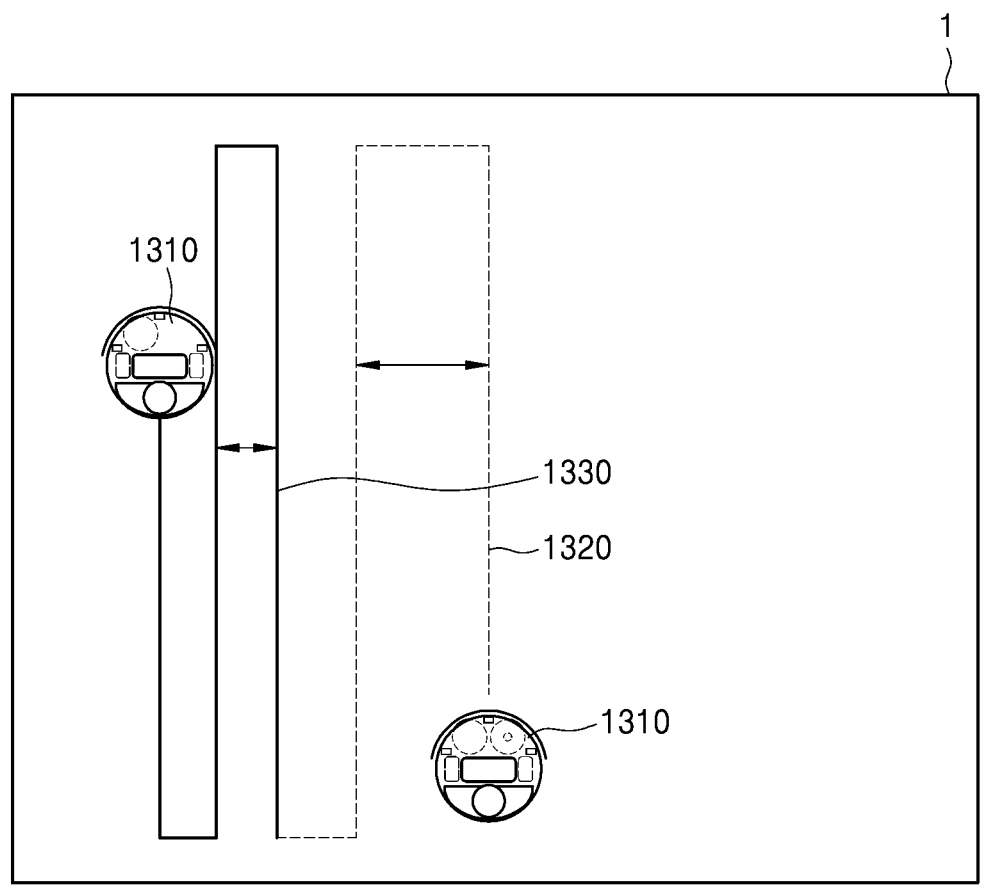
FIG. 13 is a diagram illustrating a method by which a driving robot apparatus adjusts a traveling path, according to an embodiment of the disclosure.

FIG. 13 is a diagram illustrating a method by which a driving robot apparatus adjusts a traveling path, according to an embodiment of the disclosure. A driving robot apparatus 1310 may clean a certain area 1 while traveling.

Referring to FIG. 13, the driving robot apparatus 1310 may travel in a zigzag manner within the certain area 1 along a first traveling path 1320. The first traveling path 1320 may be a preset path. For example, the first traveling path 1320 may be set based on a user input received through an input/output interface. As another example, the first traveling path 1320 may be set based on a control signal received from an external device (e.g., a server, a mobile terminal, etc.) through a communication interface.

The driving robot apparatus 1310 may detect a cleaning pad while traveling. The driving robot apparatus 1310 may identify whether the cleaning pad is detached while traveling. The driving robot apparatus 1310 may travel by adjusting the traveling path and/or the interval of the traveling path in response to the detachment of the cleaning pad.

According to an embodiment of the disclosure, a driving robot apparatus 1310 may travel along a traveling path 1330, in which the zigzag width of the traveling path 1320 is reduced, in response to the detachment of some cleaning pads among a plurality of cleaning pads. For example, the driving robot apparatus 1310 may adjust the traveling path to a preset width in response to the detachment of some cleaning pads. As another example, the driving robot apparatus 1310 may travel along the traveling path 1330, in which the zigzag width is reduced, by using a navigation map so that a portion of the area in which the driving robot apparatus 1310 has traveled overlaps. As another example, the driving robot apparatus 1310 may travel along the traveling path 1330, in which the zigzag width is reduced, by using a humidity sensor so as to travel in an area that has not been cleaned with water.

According to an embodiment of the disclosure, the driving robot apparatus 1310 may adjust the traveling path to return to a cleaning start position and/or a docking station in response to the detachment of all cleaning pads.

When the traveling path is adjusted in response to the detachment of the cleaning pad, the driving robot apparatus 1310 may output a notification that the traveling path has been adjusted. For example, the driving robot apparatus 1310 may output a preset color by using a display. As another example, the driving robot apparatus 1310 may output a certain notification sound. When the cleaning pad is detached, the driving robot apparatus 1310 may transmit, to a user's mobile device, data indicating that the cleaning pad has been detached.

According to an embodiment of the disclosure, the driving robot apparatuses 1310 and 1310 may perform cleaning by flexibly adjusting the traveling paths even when the cleaning pads are detached.

It is noted that in this and other drawings described herein, different positions and/or states of a component may be described as different components, and/or with different identifiers. For example, in FIG. 13 the robot 1310 may be the same robot 1310 after the detachment of a cleaning pad, and in FIG. 14 the robot 1410b may be the same robot 1410a after the detachment of a cleaning pad.

Figure 14:
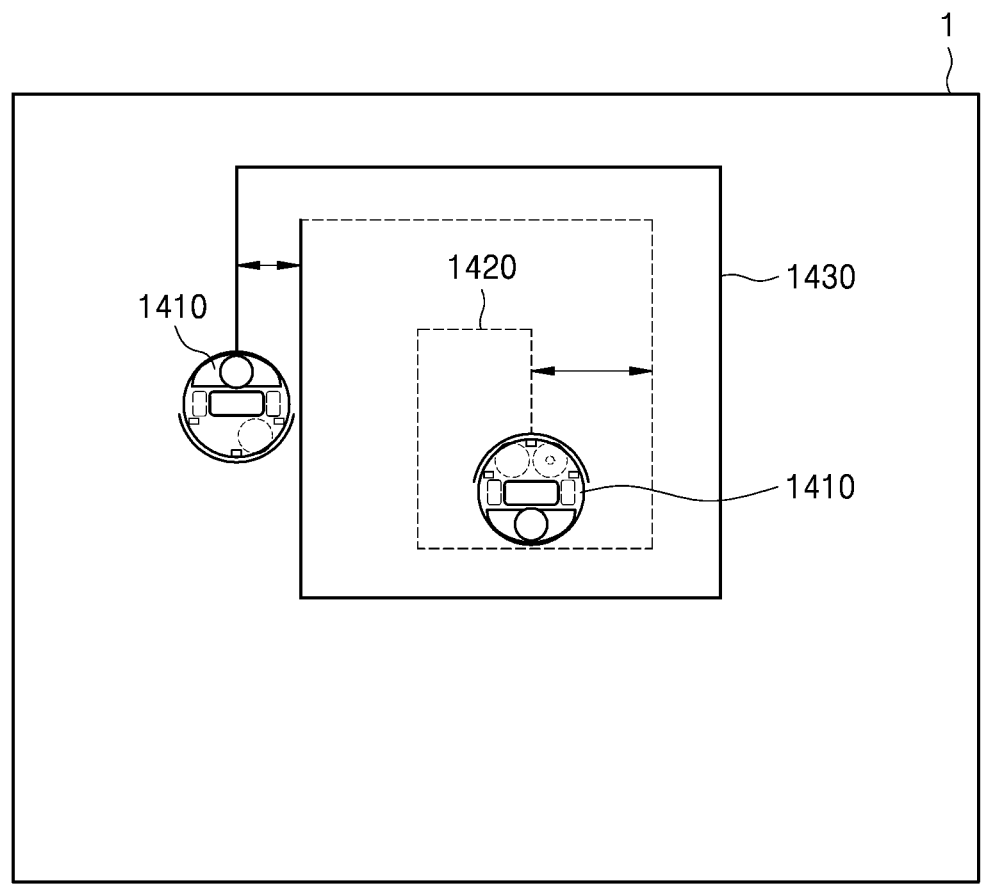
FIG. 14 is a diagram illustrating a method by which a driving robot apparatus adjusts a traveling path, according to an embodiment of the disclosure.

FIG. 14 is a diagram illustrating a method by which a driving robot apparatus adjusts a traveling path, according to an embodiment of the disclosure. A driving robot apparatus 1410 may clean a certain area 1 while traveling.

Referring to FIG. 14, the driving robot apparatus 1410 may spirally travel in the certain area 1 along a first traveling path 1420. The first traveling path 1420 may be a preset path. For example, the first traveling path 1420 may be set based on a user input received through an input/output interface. As another example, the first traveling path 1420 may be set based on a control signal received from an external device (e.g., a server, a mobile terminal, etc.) through a communication interface.

The driving robot apparatus 1410 may detect a cleaning pad while traveling. The driving robot apparatus 1410 may identify whether the cleaning pad is detached while traveling. The driving robot apparatus 1410 may travel by adjusting the traveling path and/or the interval of the traveling path in response to the detachment of the cleaning pad.

According to an embodiment of the disclosure, a driving robot apparatus 1410 may travel along a traveling path 1430, in which the spiral width of the traveling path 1420 is reduced, in response to the detachment of some cleaning pads among a plurality of cleaning pads. For example, the driving robot apparatus 1410 may adjust the traveling path to a preset width in response to the detachment of some cleaning pads. As another example, the driving robot apparatus 1410 may travel along the traveling path 1430, in which the spiral width is reduced, by using a navigation map so that a portion of the area in which the driving robot apparatus 1410 has traveled overlaps. As another example, the driving robot apparatus 1410 may travel along the traveling path 1430, in which the spiral width is reduced, by using a humidity sensor so as to travel in an area that has not been cleaned with water.

According to an embodiment of the disclosure, the driving robot apparatus 1410 may adjust the traveling path to return to a cleaning start position and/or a docking station in response to the detachment of all cleaning pads.

When the traveling path is adjusted in response to the detachment of the cleaning pad, the driving robot apparatus 1410 may output a notification that the traveling path has been adjusted. For example, the driving robot apparatus 1410 may output a preset color by using a display. As another example, the driving robot apparatus 1410 may output a certain notification sound. When the cleaning pad is detached, the driving robot apparatus 1410 may transmit, to a user's mobile device, data indicating that the cleaning pad has been detached.

According to an embodiment of the disclosure, the driving robot apparatuses 1410 and 1410 may perform cleaning by flexibly adjusting the traveling paths even when the cleaning pads are detached.

A machine-readable storage medium may be provided in the form of a non-transitory storage medium. The "non-transitory storage medium" is a tangible device and only means not including a signal (e.g., electromagnetic wave). This term does not distinguish between a case where data is semi-permanently stored in a storage medium and a case where data is temporarily stored in a storage medium. For example, the non-transitory storage medium may include a buffer in which data is temporarily stored.

According to an embodiment of the disclosure, the methods according to various embodiments of the disclosure disclosed herein may be provided by being included in a computer program product. The computer program products may be traded between a seller and a buyer as commodities. The computer program product may be distributed in the form of a machine-readable storage medium (e.g., compact disc read only memory (CD-ROM)), or may be distributed (e.g., downloaded or uploaded) online either via an application store or directly between two user devices (e.g., smartphones). In the case of the online distribution, at least a part of a computer program product (e.g., downloadable app) is stored at least temporarily on a machine-readable storage medium, such as a server of a manufacturer, a server of an application store, or a memory of a relay server, or may be temporarily generated.

What is claimed is:

1. A method of controlling a driving robot apparatus, the method comprising:
    rotating a holder with a cleaning pad fixed to the holder;
    emitting light through an opening in the holder to a surface of the cleaning pad fixed to the holder while the holder is rotating, the surface of the cleaning pad including two or more reflective areas having different light reflectivities from each other and arranged in a rotational direction about the surface of the cleaning pad;
    receiving reflected light reflected from about the surface of the cleaning pad through the opening in the holder while the holder is rotating; and
    identifying the cleaning pad based on the received reflected light.

2. The method of claim 1, wherein
the identifying of the cleaning pad includes:
    identifying whether the cleaning pad is fixed to the holder by using standard deviation of intensity of the received reflected light.

3. The method of claim 2, further comprising:
determining a traveling path of the driving robot apparatus, based on whether the cleaning pad is fixed to the holder.

4. The method of claim 3, wherein
the determining of the traveling path includes:
    identifying a holder to which a cleaning pad is not fixed, among a plurality of holders to which cleaning pads are fixed; and
    adjusting an interval of the traveling path of the driving robot apparatus, based on a result of the identifying the holder to which the cleaning pad is not fixed.

5. The method of claim 1, further comprising:
supplying an amount of water to the cleaning pad, based on whether the cleaning pad is fixed to the holder.

6. The method of claim 1, further comprising:
based on identifying an empty holder to which a cleaning pad is not fixed from among a plurality of holders, supplying an amount of water to cleaning pads fixed to holders other than the empty holder from among the plurality of holders.

7. The method of claim 1, wherein
the identifying of the cleaning pad includes:
    identifying a type of the cleaning pad fixed to the holder among a plurality of types of cleaning pads by using standard deviation of intensity of the received reflected light.

8. The method of claim 7, further comprising:
determining a traveling path of the driving robot apparatus, based on the identified type of the cleaning pad.

9. The method of claim 7, further comprising:
supplying an amount of water corresponding to the identified type of the cleaning pad to the cleaning pad, based on the identified type of the cleaning pad.

10. A non-transitory computer-readable recording medium having recorded thereon a computer program for causing a computer to perform the method of claim 1.

11. A driving robot apparatus comprising:
    a holder including an opening and configured to rotate, and to which a cleaning pad is fixable so as to clean the surface as the driving robot apparatus moves over the surface; and
    a processor configured to perform control to:
        rotate the holder with the cleaning pad fixed to the holder,
        cause light to be emitted through the opening in the holder to a surface of the cleaning pad fixed to the holder while the holder is rotating, the surface of the cleaning pad including two or more reflective areas having different light reflectivities from each other and arranged in a rotational direction about the surface of the cleaning pad,
        receive reflected light reflected from about the surface of the cleaning pad through the opening in the holder while the holder is rotating, and
        identify the cleaning pad based on the received reflected light.

12. The driving robot apparatus of claim 11, wherein
the processor is further configured to perform control to:
    identify whether the cleaning pad is fixed to the holder by using standard deviation of intensity of the received reflected light.

13. The driving robot apparatus of claim 12, wherein
the processor is further configured to perform control to:
    determine a traveling path of the driving robot apparatus, based on whether the cleaning pad is fixed to the holder.

14. The driving robot apparatus of claim 13, wherein the processor is further configured to perform control to:
 adjust an interval of the traveling path of the driving robot apparatus, based on a result of identifying a holder to which a cleaning pad is not fixed, among a plurality of holders to which cleaning pads are fixed.

15. The driving robot apparatus of claim 11, wherein the processor is further configured to perform control to:
 supply an amount of water to the cleaning pad, based on whether the cleaning pad is fixed to the holder.

16. The driving robot apparatus of claim 11, wherein the processor is further configured to perform control to:
 based on identifying an empty holder to which a cleaning pad is not fixed from among a plurality of holders, supply an amount of water to cleaning pads fixed to holders other than the empty holder from among the plurality of holders.

17. The driving robot apparatus of claim 11, wherein the processor is further configured to perform control to:
 identify a type of the cleaning pad fixed to the holder among a plurality of types of cleaning pads by using standard deviation of intensity of the received reflected light.

18. The driving robot apparatus of claim 17, wherein the processor is further configured to perform control to:
 determine a traveling path of the driving robot apparatus, based on the identified type of the cleaning pad.

19. The driving robot apparatus of claim 17, wherein the processor is further configured to perform control to:
 supply an amount of water corresponding to the identified type of the cleaning pad to the cleaning pad, based on the identified type of the cleaning pad.

20. A method of controlling a driving robot apparatus, the method comprising:
 rotating a holder with a cleaning pad fixed to the holder;
 emitting light through an opening in the holder to a surface of the cleaning pad fixed to the holder while the holder is rotating, the surface of the cleaning pad including two or more reflective areas having different light reflectivities from each other;
 receiving reflected light reflected from the surface of the cleaning pad through the opening in the holder while the holder is rotating;
 identifying the cleaning pad based on the received reflected light; and
 based on identifying an empty holder to which a cleaning pad is not fixed from among a plurality of holders, supplying an amount of water to cleaning pads fixed to holders other than the empty holder from among the plurality of holders.

* * * * *